United States Patent
Lei et al.

(10) Patent No.: US 11,672,007 B2
(45) Date of Patent: Jun. 6, 2023

(54) FEEDBACK REPORTING IN A TWO-STEP RANDOM-ACCESS PROCEDURE

(71) Applicant: QUALCOMM Incorporated, San Diego, CA (US)

(72) Inventors: Jing Lei, San Diego, CA (US); Yong Li, San Diego, CA (US); Ruhua He, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 52 days.

(21) Appl. No.: 17/192,837

(22) Filed: Mar. 4, 2021

(65) Prior Publication Data

US 2021/0282179 A1 Sep. 9, 2021

Related U.S. Application Data

(60) Provisional application No. 62/986,594, filed on Mar. 6, 2020.

(51) Int. Cl.
*H04W 74/00* (2009.01)
*H04L 1/18* (2023.01)
(Continued)

(52) U.S. Cl.
CPC ......... *H04W 74/008* (2013.01); *H04L 1/1812* (2013.01); *H04W 72/20* (2023.01); *H04W 74/0833* (2013.01)

(58) Field of Classification Search
CPC ... H04L 1/0027; H04L 1/1812; H04L 1/1896; H04W 52/0216; H04W 52/0229;
(Continued)

(56) References Cited

U.S. PATENT DOCUMENTS

2008/0259900 A1* 10/2008 Masuda .............. H04W 74/008
370/348
2011/0243075 A1* 10/2011 Luo ..................... H04W 74/004
370/329
(Continued)

OTHER PUBLICATIONS

Apple: "RRC Message Transmisson in 2-Step RACH", 3GPP Draft, 3GPP TSG-RAN WG2 Meeting #107, R2-1909872_RRC Message Transmisson in 2-Step RACH_V0, 3rd Generation Partnership Project (3GPP), Mobile Competence Centre, 650, Route Des Lucioles, F-06921 Sophia-Antipolis Cedex, France, vol. RAN WG2, No. Prague, Czech Republic, Aug. 26, 2019-Aug. 30, 2019, Aug. 16, 2019 (Aug. 18, 2019), XP051767663, 4 Pages, Retrieved from the Internet: URL:http://www.3gpp.org/ftp/tsg_ran/WG2_RL2/TSGR2_107/Docs/R2-1909872.zip [retrieved on Aug. 16, 2019] the Whole Document.

(Continued)

*Primary Examiner* — Hassan A Phillips
*Assistant Examiner* — Hicham B Foud
(74) *Attorney, Agent, or Firm* — Holland & Hart LLP; Dang M. Vo

(57) ABSTRACT

Methods, systems, and devices for wireless communication are described. A UE may transmit a random-access message to a base station and receive at least a control channel portion of a response to the random-access message from the base station, where the response may also include a data channel portion. Using the techniques described herein, the UE may then manage flow control feedback reporting to the base station based on whether the data channel portion includes a radio resource control (RRC) message. For instance, the UE may report an acknowledgment for the response if the data channel portion does not include an RRC message and a TA timer at the UE is running (e.g., regardless of whether the UE is able to or attempts to decode the data (Continued)

channel portion, since the data channel portion may only include TA information which may not be useful to the UE).

34 Claims, 20 Drawing Sheets

(51) Int. Cl.
*H04W 72/04* (2023.01)
*H04W 74/08* (2009.01)
*H04L 1/1812* (2023.01)
*H04W 72/20* (2023.01)

(58) Field of Classification Search
CPC .......... H04W 52/028; H04W 56/0045; H04W 72/0406; H04W 74/008; H04W 74/0833; H04W 8/04; H04W 72/20; Y02D 30/70
See application file for complete search history.

(56) References Cited

U.S. PATENT DOCUMENTS

| | | | | |
|---|---|---|---|---|
| 2013/0039297 | A1* | 2/2013 | Wang | H04W 72/042 |
| | | | | 370/328 |
| 2017/0208008 | A1* | 7/2017 | Quevedo | H04L 43/16 |
| 2019/0068313 | A1* | 2/2019 | Lyu | H04L 1/0007 |
| 2019/0199420 | A1* | 6/2019 | Faxér | H04B 7/0632 |
| 2019/0335515 | A1* | 10/2019 | Chen | H04W 74/0833 |
| 2019/0357266 | A1* | 11/2019 | Ren | H04W 80/02 |
| 2019/0363843 | A1* | 11/2019 | Gordaychik | H04W 52/58 |
| 2020/0029366 | A1* | 1/2020 | Xiong | H04L 1/1607 |
| 2020/0037361 | A1* | 1/2020 | Chakraborty | H04W 74/0833 |
| 2020/0092777 | A1* | 3/2020 | Agiwal | H04W 36/08 |
| 2020/0107371 | A1* | 4/2020 | Kunt | H04W 76/27 |
| 2020/0213902 | A1* | 7/2020 | Xing | H04W 72/1263 |
| 2020/0314917 | A1* | 10/2020 | Jeon | H04W 74/08 |
| 2020/0344812 | A1* | 10/2020 | Agiwal | H04W 72/042 |
| 2020/0351801 | A1* | 11/2020 | Jeon | H04W 52/48 |
| 2020/0351955 | A1* | 11/2020 | Jeon | H04L 5/0053 |
| 2021/0051736 | A1* | 2/2021 | Jeon | H04W 76/18 |
| 2021/0144742 | A1* | 5/2021 | Jeon | H04W 52/50 |
| 2021/0211232 | A1* | 7/2021 | Hwang | H04W 72/0446 |
| 2021/0243814 | A1* | 8/2021 | Zhang | H04W 74/0833 |
| 2021/0259021 | A1* | 8/2021 | Huang | H04W 76/10 |
| 2022/0078856 | A1* | 3/2022 | Jeon | H04W 74/0866 |
| 2022/0110184 | A1* | 4/2022 | Jeon | H04W 74/0841 |

OTHER PUBLICATIONS

ERICSSON: "HARQ Use in 2-Step RA", 3GPP Draft, 3GPP TSG-RAN WG2 #107, R2-1909930—HARQ Use in 2-Step RA, 3rd Generation Partnership Project (3GPP), Mobile Competence Centre, 650, Route Des Lucioles, F-06921 Sophia-Antipolis Cedex, France, vol. RAN WG2, No. Prague, Czech Republic, Aug. 26, 2019-Aug. 30, 2019, Aug. 15, 2019 (Aug. 15, 2019), XP051767721, 3 Pages, Retrieved from the Internet: URL:http://www.3gpp.org/ftp/tsg_ran/WG2_RL2/TSGR2_107/Docs/R2-1909930.zip [retrieved on Aug. 15, 2019] the Whole Document.

Intel Corporation: "Consideration of MsgB Contents and Design", 3GPP Draft, R2-1906280, 3GPP TSG RAN WG2 #106, MSGB_V00, 3rd Generation Partnership Project (3GPP), Mobile Competence Centre, 650, Route Des Lucioles, F-06921 Sophia-Antipolis Cedex France, vol. RAN WG2, No. Reno, Nevada, US, May 13, 2018-May 17, 2019, May 13, 2019 (May 13, 2019), XP051729747, 6 Pages, Retrieved from the Internet: URL:http://www.3gpp.org/ftp/Meetings%5F3GPP%5FSYNC/RAN2/Docs/R2%2D1906280%2Ezip [retrieved on May 13, 2019] the Whole Document.

International Search Report and Written Opinion—PCT/US2021/021210—ISA/EPO—Jul. 1, 2021.

QUALCOMM Incorporated: "Discussion on HARQ Feedback for msgB and RNTI Design for msgB", 3GPP Draft, 3GPP TSG-RAN WG2 Meeting #107bis , R2-1913401_Discussion on HARQ Feedback for msgB and RNTI Design for msgB, 3rd Generation Partnership Project (3GPP), Mobile Competence Centre, 650, Route Des Lucioles, F-06921 Sophia-Ant, vol. RAN WG2. No. Chongqing, China, Oct. 14, 2019-Oct. 18, 2019, Oct. 4, 2019 (Oct. 4, 2019), XP051804979, 6 Pages, Retrieved from the Internet: URL:https://ftp.3gpp.org/tsg_ran/WG2_RL2/TSGR2_107bis/Docs/R2-1913401.zip R2-1913401_Discussion on HARQ feedback for msgB and RNTI design for msgB.docx [retrieved on Oct. 4, 2019] pp. 1-3, the whole document.

\* cited by examiner

| RRC State | Basic Contents of msgB for "SuccessRAR" and "FallbackRAR" | | | |
|---|---|---|---|---|
| | Successful Decoding of msgA Payload | | Successful Detection of msgA Preamble Only | |
| | msgB PDCCH | msgB PDSCH (SuccessRAR) | msgB PDCCH | msgB PDSCH (FallbackRAR) |
| Connected | • CRC masked by C-RNTI<br>• DCI Format 1_0 | • TA MAC CE<br>• [SRB RRC message] | • CRC masked by msgB-RNTI<br>• GC DCI Format 1_0 | • RAPID<br>• TA MAC CE<br>• RAR Grant<br>• TC-RNTI |
| Inactive or Idle | • CRC masked by msgB-RNTI<br>• GC DCI Format 1_0 (2 reserved bits indicating LSBs of SFN) | • TA MAC CE<br>• Contention resolution MAC CE<br>• C-RNTI<br>• TPC for PUCCH<br>• PUCCH Resource Indication<br>• PDSCH to HARQ FB Timing Indicator<br>• C-RNTI<br>• [SRB RRC message] | | |

FIG. 5

| DCI Format 1_0 with CRC Masked by C_RNTI ||
|---|---|
| Field | Bit Width |
| Identifier of DCI formats | 1 |
| Frequency-domain resource assignment | Variable |
| Time domain resource assignment | 4 |
| VRB-to-PRB mapping | 1 |
| MCS | 5 |
| NDI | 1 |
| RV | 2 |
| HARQ Process Number | 4 |
| DAI | 2 |
| TPC for PUCCH | 2 |
| PUCCH Resource Indicator | 3 |
| PDSCH to HARQ FB Timing Indicator | 3 |

600-a

| Updated DCI Format for msgB, with CRC Masked by msgB-RNTI ||
|---|---|
| Field | Bit Width |
| Frequency domain resource assignment | Variable |
| Time domain resource assignment | 4 |
| VRB-to-PRB mapping | 1 |
| MCS | 5 |
| TB Scaling | 2 |
| LSB of SFN | 2 |
| Reserved Bits | 14 |

600-b

FIG. 6

FEEDBACK REPORTING IN A TWO-STEP RANDOM-ACCESS PROCEDURE

CROSS REFERENCE

The present Application for Patent claims the benefit of U.S. Provisional Patent Application No. 62/986,594 by LEI et al., entitled "FEEDBACK REPORTING IN A TWO-STEP RANDOM-ACCESS PROCEDURE," filed Mar. 6, 2020, assigned to the assignee hereof, and expressly incorporated by reference herein.

FIELD OF TECHNOLOGY

The following relates generally to wireless communications and more specifically to feedback reporting in a two-step random-access procedure.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices which may be otherwise known as user equipment (UE). In some wireless communications systems, a UE may use a two-step random-access procedure to establish a connection with a base station and/or identify suitable parameters and configurations for communicating with the base station. The two-step random-access procedure may include a transmission of a first random-access message from a UE to a base station and a transmission of a second random-access message from the base station to the UE (e.g., a random-access response (RAR) message). In some cases, the UE may be configured to transmit flow control feedback to the base station for the second random-access message. Improved techniques for performing a two-step random-access procedure may be desirable to reduce overhead and latency and increase power savings.

SUMMARY

The described techniques relate to improved methods, systems, devices, and apparatuses that support feedback reporting in a two-step random-access procedure. A UE may transmit a random-access message to a base station and receive at least a control channel portion of a response to the random-access message from the base station, where the response may also include a data channel portion. The UE may then manage flow control feedback reporting to the base station based on whether the data channel portion includes a radio resource control (RRC) message. For instance, the UE may report an acknowledgment (ACK) for the response if the data channel portion does not include an RRC message, and a timing advance (TA) timer at the UE is running (e.g., regardless of whether the UE is able to or attempts to decode the data channel portion, since the data channel portion may only include TA information which may not be useful to the UE).

A method of wireless communication at a UE is described. The method may include transmitting, to a base station as part of a random-access procedure, a random-access message including a preamble and a payload, receiving, from the base station, at least a control channel portion of a response to the random-access message, where the response includes the control channel portion and a data channel portion, determining, based on at least one parameter of the control channel portion, whether the data channel portion includes at least one radio resource control message, and managing flow control feedback reporting for the response based on the determining.

An apparatus for wireless communication at a UE is described. The apparatus may include a processor, memory coupled with the processor, and instructions stored in the memory. The instructions may be executable by the processor to cause the apparatus to transmit, to a base station as part of a random-access procedure, a random-access message including a preamble and a payload, receive, from the base station, at least a control channel portion of a response to the random-access message, where the response includes the control channel portion and a data channel portion, determine, based on at least one parameter of the control channel portion, whether the data channel portion includes at least one radio resource control message, and manage flow control feedback reporting for the response based on the determining.

Another apparatus for wireless communication at a UE is described. The apparatus may include means for transmitting, to a base station as part of a random-access procedure, a random-access message including a preamble and a payload, receiving, from the base station, at least a control channel portion of a response to the random-access message, where the response includes the control channel portion and a data channel portion, determining, based on at least one parameter of the control channel portion, whether the data channel portion includes at least one radio resource control message, and managing flow control feedback reporting for the response based on the determining.

A non-transitory computer-readable medium storing code for wireless communication at a UE is described. The code may include instructions executable by a processor to transmit, to a base station as part of a random-access procedure, a random-access message including a preamble and a payload, receive, from the base station, at least a control channel portion of a response to the random-access message, where the response includes the control channel portion and a data channel portion, determine, based on at least one parameter of the control channel portion, whether the data channel portion includes at least one radio resource control message, and manage flow control feedback reporting for the response based on the determining.

Some examples of the method, apparatuses, and non-transitory computer-readable medium described herein may further include operations, features, means, or instructions for determining that the data channel portion does not include the at least one radio resource control message, determining that a timing advance timer at the UE is running, suppressing an uplink timing adjustment based on determining that the timing advance timer at the UE is running, and transmitting, to the base station, a flow control acknowledgment for the response based on determining that the data channel portion does not include the at least one radio resource control message. Some examples of the method, apparatuses, and non-transitory computer-readable medium described herein may further include operations, features, means, or instructions for suppressing decoding of the data channel portion based on determining that the timing advance timer at the UE is running and that the data channel portion does not include the at least one radio resource control message.

Some examples of the method, apparatuses, and non-transitory computer-readable medium described herein may further include operations, features, means, or instructions for determining that the data channel portion does not include the at least one radio resource control message, determining that a timing advance timer at the UE may have expired, and performing a decoding process on the data channel portion based on determining that the timing advance timer at the UE may have expired. Some examples of the method, apparatuses, and non-transitory computer-readable medium described herein may further include operations, features, means, or instructions for successfully decoding the data channel portion to identify timing advance information for uplink timing adjustment, obtaining the timing advance information from the successfully decoded data channel, performing the uplink timing adjustment using the timing advance information, and transmitting, to the base station, a flow control acknowledgment for the response after performing the uplink timing adjustment based on successfully decoding the data channel portion.

Some examples of the method, apparatuses, and non-transitory computer-readable medium described herein may further include operations, features, means, or instructions for failing to decode the data channel portion to identify timing advance information for uplink timing adjustment, failing to obtain the timing advance information from the data channel, and monitoring for a retransmission of the response to the random-access message to identify the timing advance information before a response window expires, where the response window starts from a first symbol of an earliest search space set for the control channel portion of the response, and a duration of the response window may be configured by the base station and indicated in system information.

Some examples of the method, apparatuses, and non-transitory computer-readable medium described herein may further include operations, features, means, or instructions for determining that the data channel portion includes the at least one radio resource control message, and performing a decoding process on the data channel portion based on determining that the data channel portion includes the at least one radio resource control message. Some examples of the method, apparatuses, and non-transitory computer-readable medium described herein may further include operations, features, means, or instructions for successfully decoding the data channel portion to identify the at least one radio resource control message and timing advance information for uplink timing adjustment, and transmitting, to the base station, a flow control acknowledgment for the response based on successfully decoding the data channel portion.

Some examples of the method, apparatuses, and non-transitory computer-readable medium described herein may further include operations, features, means, or instructions for determining that a timing advance timer at the UE may have expired, and performing the uplink timing adjustment using the timing advance information based on determining that the timing advance timer at the UE may have expired. Some examples of the method, apparatuses, and non-transitory computer-readable medium described herein may further include operations, features, means, or instructions for determining that a timing advance timer at the UE is running, and suppressing the uplink timing adjustment based on determining that the timing advance timer at the UE is running.

Some examples of the method, apparatuses, and non-transitory computer-readable medium described herein may further include operations, features, means, or instructions for failing to decode the data channel portion to identify the at least one radio resource control message and timing advance information for uplink timing adjustment, determining that a timing advance timer at the UE is running, suppressing the uplink timing adjustment based on the determining, and transmitting, to the base station, a flow control negative acknowledgment for the response based on failing to decode the data channel portion. Some examples of the method, apparatuses, and non-transitory computer-readable medium described herein may further include operations, features, means, or instructions for failing to decode the data channel portion to identify the at least one radio resource control message and timing advance information for uplink timing adjustment, determining that a timing advance timer at the UE may have expired, and monitoring for a retransmission of the response to the random-access message including the at least one radio resource control message and the timing advance information.

In some examples of the method, apparatuses, and non-transitory computer-readable medium described herein, determining whether the data channel portion may include operations, features, means, or instructions for determining a transport block size of the data channel portion based on the at least one parameter, and comparing the transport block size of the data channel portion to a threshold transport block size. Some examples of the method, apparatuses, and non-transitory computer-readable medium described herein may further include operations, features, means, or instructions for determining that the transport block size of the data channel portion is equal to or below the threshold transport block size based on the comparing, and determining that the data channel portion does not include the at least one radio resource control message based on the transport block size of the data channel portion being equal to or below the threshold transport block size.

Some examples of the method, apparatuses, and non-transitory computer-readable medium described herein may further include operations, features, means, or instructions for determining that the transport block size of the data channel portion is above the threshold transport block size based on the comparing, and determining that the data channel portion includes the at least one radio resource control message based on the transport block size of the data channel portion being above the threshold transport block size. Some examples of the method, apparatuses, and non-transitory computer-readable medium described herein may further include operations, features, means, or instructions for receiving, from the base station, an indication of the threshold transport block size in system information or radio resource control signaling. In some examples of the method, apparatuses, and non-transitory computer-readable medium described herein, the at least one parameter of the control channel portion includes an explicit indication of whether the data channel portion includes the at least one radio resource control message.

In some examples of the method, apparatuses, and non-transitory computer-readable medium described herein, managing flow control feedback reporting for the data channel portion may include operations, features, means, or instructions for receiving, from the base station, a resource indicator and a feedback timing indicator for the flow control feedback reporting in the control channel portion or in dedicated radio resource control signaling, and transmitting, to the base station, flow control feedback in accordance with the resource indicator and the feedback timing indicator. In some examples of the method, apparatuses, and non-transitory computer-readable medium described herein, the data channel portion includes at least timing advance information for uplink timing adjustment and optionally the at least one radio resource control message, where the timing advance information may be derived based on the preamble of the random-access message and the at least one radio resource control message.

A method of wireless communication at a base station is described. The method may include receiving, from a UE as part of a random-access procedure, a random-access message including a preamble and a payload, transmitting, to the UE, a response to the random-access message including a control channel portion and a data channel portion, transmitting, to the UE, a configuration enabling the UE to determine whether the data channel portion includes at least one radio resource control message, and monitoring for flow control feedback from the UE for the response to the random-access message.

An apparatus for wireless communication at a base station is described. The apparatus may include a processor, memory coupled with the processor, and instructions stored in the memory. The instructions may be executable by the processor to cause the apparatus to receive, from a UE as part of a random-access procedure, a random-access message including a preamble and a payload, transmit, to the UE, a response to the random-access message including a control channel portion and a data channel portion, transmit, to the UE, a configuration enabling the UE to determine whether the data channel portion includes at least one radio resource control message, and monitor for flow control feedback from the UE for the response to the random-access message.

Another apparatus for wireless communication at a base station is described. The apparatus may include means for receiving, from a UE as part of a random-access procedure, a random-access message including a preamble and a payload, transmitting, to the UE, a response to the random-access message including a control channel portion and a data channel portion, transmitting, to the UE, a configuration enabling the UE to determine whether the data channel portion includes at least one radio resource control message, and monitoring for flow control feedback from the UE for the response to the random-access message.

A non-transitory computer-readable medium storing code for wireless communication at a base station is described. The code may include instructions executable by a processor to receive, from a UE as part of a random-access procedure, a random-access message including a preamble and a payload, transmit, to the UE, a response to the random-access message including a control channel portion and a data channel portion, transmit, to the UE, a configuration enabling the UE to determine whether the data channel portion includes at least one radio resource control message, and monitor for flow control feedback from the UE for the response to the random-access message.

In some examples of the method, apparatuses, and non-transitory computer-readable medium described herein, transmitting the configuration may include operations, features, means, or instructions for transmitting, to the UE, an indication of a threshold transport block size for the data channel portion, where a transport block size above the threshold transport block size indicates that the data channel portion includes the at least one radio resource control message, and a transport block size equal to or below the threshold transport block size indicates that the data channel portion does not include the at least one radio resource control message. In some examples of the method, apparatuses, and non-transitory computer-readable medium described herein, transmitting the configuration may include operations, features, means, or instructions for transmitting, in the control channel, an explicit indication of whether the data channel portion includes the at least one radio resource control message.

Some examples of the method, apparatuses, and non-transitory computer-readable medium described herein may further include operations, features, means, or instructions for transmitting, to the UE, a resource indicator and a feedback timing indicator for the flow control feedback reporting in the control channel portion or in dedicated radio resource control signaling, and receiving, from the UE, flow control feedback in accordance with the resource indicator and the feedback timing indicator. In some examples of the method, apparatuses, and non-transitory computer-readable medium described herein, the data channel portion includes at least timing advance information for uplink timing adjustment and optionally the at least one radio resource control message.

BRIEF DESCRIPTION OF THE DRAWINGS

FIG. 5 illustrates an example of content included in a message B (msgB) transmission in a two-step RACH procedure in accordance with aspects of the present disclosure.

FIG. 6 illustrates examples of parameters included in DCI of a msgB physical downlink control channel (PDCCH) in accordance with aspects of the present disclosure.

DETAILED DESCRIPTION

Figure 1:
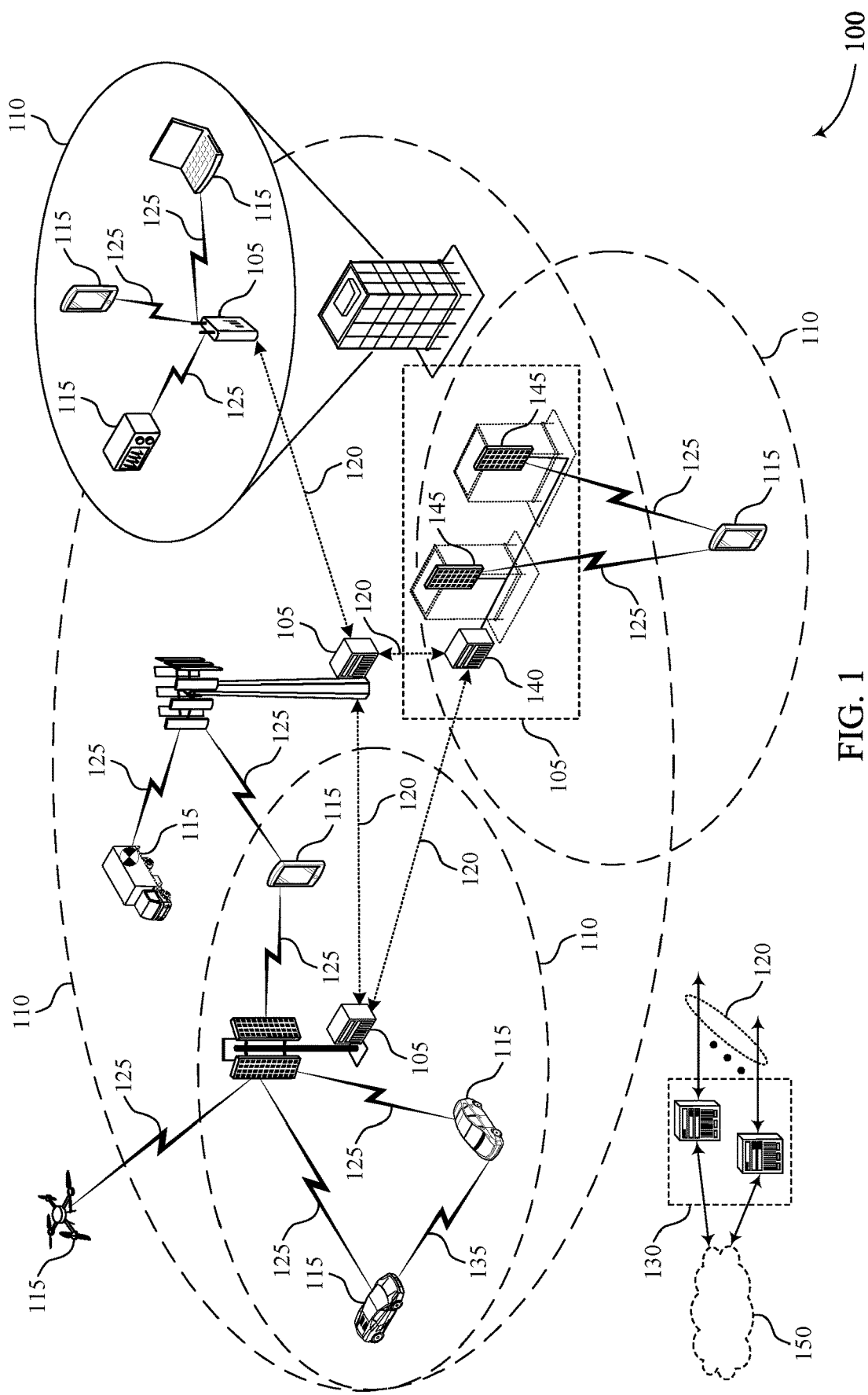
FIG. 1 illustrates an example of a wireless communications system that supports feedback reporting in a two-step random-access procedure in accordance with aspects of the present disclosure.

In some wireless communications systems, a user equipment (UE) may use a two-step random-access channel (RACH) procedure to establish or re-establish a connection with a base station or identify suitable parameters and configurations for communicating with the base station. As part of the two-step RACH procedure, the UE may transmit a RACH message including a preamble and payload to the base station. The base station may receive the RACH message and may transmit a response to the RACH message to the UE (e.g., a random-access response (RAR)). The response may include a control channel portion and a data channel portion. The control channel portion may include DCI and a cyclic redundancy check (CRC) field masked by a cell radio network temporary identifier (C-RNTI). The data channel portion may include timing advance (TA) information and optionally one or more radio resource control (RRC) messages. After successfully decoding the control channel portion of the response, the UE may attempt to decode the data channel portion. The UE 115 may then report HARQ feedback for the response.

In some cases, the UE may transmit an acknowledgment (ACK) to the base station if the UE is able to successfully decode the control channel portion and data channel portion of the response, and the UE may transmit a negative acknowledgment (NACK) to the base station if the UE is able to successfully decode the control channel portion but fails to successfully decode the data channel portion of the response. In such cases, however, if the data channel portion of the response only includes TA information, and a TA timer at the UE is running, the data channel portion may be redundant for the UE. Nevertheless, if the UE fails to decode the data channel portion, the UE may transmit a NACK to the base station, and the base station may retransmit the response. As a result, latency and overhead associated with performing the random-access procedure may be increased. Further, the UE may waste power and other resources attempting to decode the data channel portion of the response and retransmissions of the response.

As described herein, a wireless communications system may support efficient techniques for managing flow control feedback in a random-access procedure to limit latency, overhead, and power consumption. In particular, after receiving the response, the UE may determine whether the data channel portion of the response includes an RRC message. The UE may then manage flow control feedback reporting to the base station based on whether the data channel portion includes an RRC message. For instance, the UE may report an ACK for the response if the data channel portion does not include an RRC message and a TA timer at the UE is running (e.g., regardless of whether the UE is able to or attempts to decode the data channel portion, since the data channel portion may only include TA information which may not be useful to the UE). In some cases, to further improve power savings, the UE may also suppress decoding of the data channel portion of the response if the data channel portion does not include an RRC message and a TA timer at the UE is running.

Aspects of the disclosure introduced above are described below in the context of a wireless communications system. Examples of processes and signaling exchanges that support feedback reporting in a two-step random-access procedure are then described. Aspects of the disclosure are further illustrated by and described with reference to apparatus diagrams, system diagrams, and flowcharts that relate to feedback reporting in a two-step random-access procedure.

FIG. 1 illustrates an example of a wireless communications system 100 that supports feedback reporting in a two-step random-access procedure in accordance with aspects of the present disclosure. The wireless communications system 100 may include one or more base stations 105, one or more UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

The communication links 125 shown in the wireless communications system 100 may include uplink transmissions from a UE 115 to a base station 105, or downlink transmissions from a base station 105 to a UE 115. The uplink transmissions may include control information transmissions in a physical uplink control channel (PUCCH) or data transmissions in a physical uplink shared channel (PUSCH). The downlink transmissions may include control information transmissions in a physical downlink control channel (PDCCH) or data transmissions in a physical downlink shared channel (PDSCH). Carriers may carry downlink or uplink communications (e.g., in an FDD mode) or may be configured to carry downlink and uplink communications (e.g., in a TDD mode).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$, may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming.

The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ feedback may include an ACK indicating that a receiving device successfully detected and decoded a transmission or a NACK indicating that a receiving device failed to detect or decode a transmission. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In wireless communications system 100, a UE 115 may use a RACH procedure to establish or re-establish a connection with a base station 105 and/or identify suitable parameters and configurations for communicating with the base station 105. Wireless communications system 100 may support four-step RACH procedures and two-step RACH procedures. As part of a two-step RACH procedure, a UE 115 may transmit a first RACH message (msgA) including a preamble and payload to a base station 105. The base station 105 may receive the msgA and may transmit a second RACH message (msgB) to the UE 115 (e.g., response to the first RACH message). The msgB may include a msgB PDCCH (e.g., control channel portion) and a msgB PDSCH (e.g., data channel portion). The msgB PDCCH may include DCI and a CRC masked by a C-RNTI, and the msgB PDSCH may include TA information and optionally one or more RRC messages (e.g., a TA MAC CE multiplexed with one or more downlink RRC messages). After successfully decoding the msgB PDCCH, the UE 115 may attempt to decode the msgB PDSCH. The UE 115 may then report HARQ feedback for the msgB.

A successful completion of a two-step RACH procedure may occur when the UE 115 transmits a HARQ ACK after decoding the msgB PDSCH (where the msgB PDSCH carries a TA MAC CE of 12 bits). The UE 115 (e.g., an RRC connected UE 115) may be allowed to transmit HARQ feedback (e.g., ACK or NACK) if the following conditions are satisfied simultaneously: a TA timer at the UE 115 is still running prior to a HARQ feedback transmission and the UE 115 has successfully decoded the msgB PDCCH. These conditions for transmitting HARQ feedback may apply when the CRC of msgB PDCCH is scrambled by a C-RNTI specific to the UE 115 and when the msgB PDCCH (e.g., DCI format 1-0) carries a PUCCH resource indicator and PDSCH to HARQ feedback timing indicator for the UE 115 to transmit the HARQ feedback. The PUCCH resource indicator may indicate the PUCCH resource for the UE 115 to use to transmit HARQ feedback, and the PDSCH to HARQ feedback timing indicator may indicate a number of slots (or other time intervals) between the msgB PDSCH and the HARQ feedback from the UE 115.

In some cases, the UE 115 may transmit an ACK to the base station 105 if the UE 115 is able to successfully decode the control channel portion and the data channel portion of the response, and the UE 115 may transmit a NACK to the base station 105 if the UE 115 is able to successfully decode the control channel portion but fails to decode the data channel portion of the response. In such cases, however, if the data channel portion of the response only includes TA information, and a TA timer at the UE 115 is running, the data channel portion may be redundant for the UE 115. Nevertheless, if the UE 115 fails to decode the data channel portion, the UE 115 may transmit a NACK to the base station 105, and the base station 105 may retransmit the response. As a result, latency and overhead associated with performing the random-access procedure may be increased. Further, the UE 115 may waste power and other resources attempting to decode the data channel portion of the response and retransmissions of the response. Wireless communications system 100 may support efficient techniques for managing flow control feedback in a random-access procedure. These techniques may allow for power savings and latency reduction at an RRC connected UE performing a two-step RACH procedure and for downlink signaling overhead reduction for a network.

Figure 2:
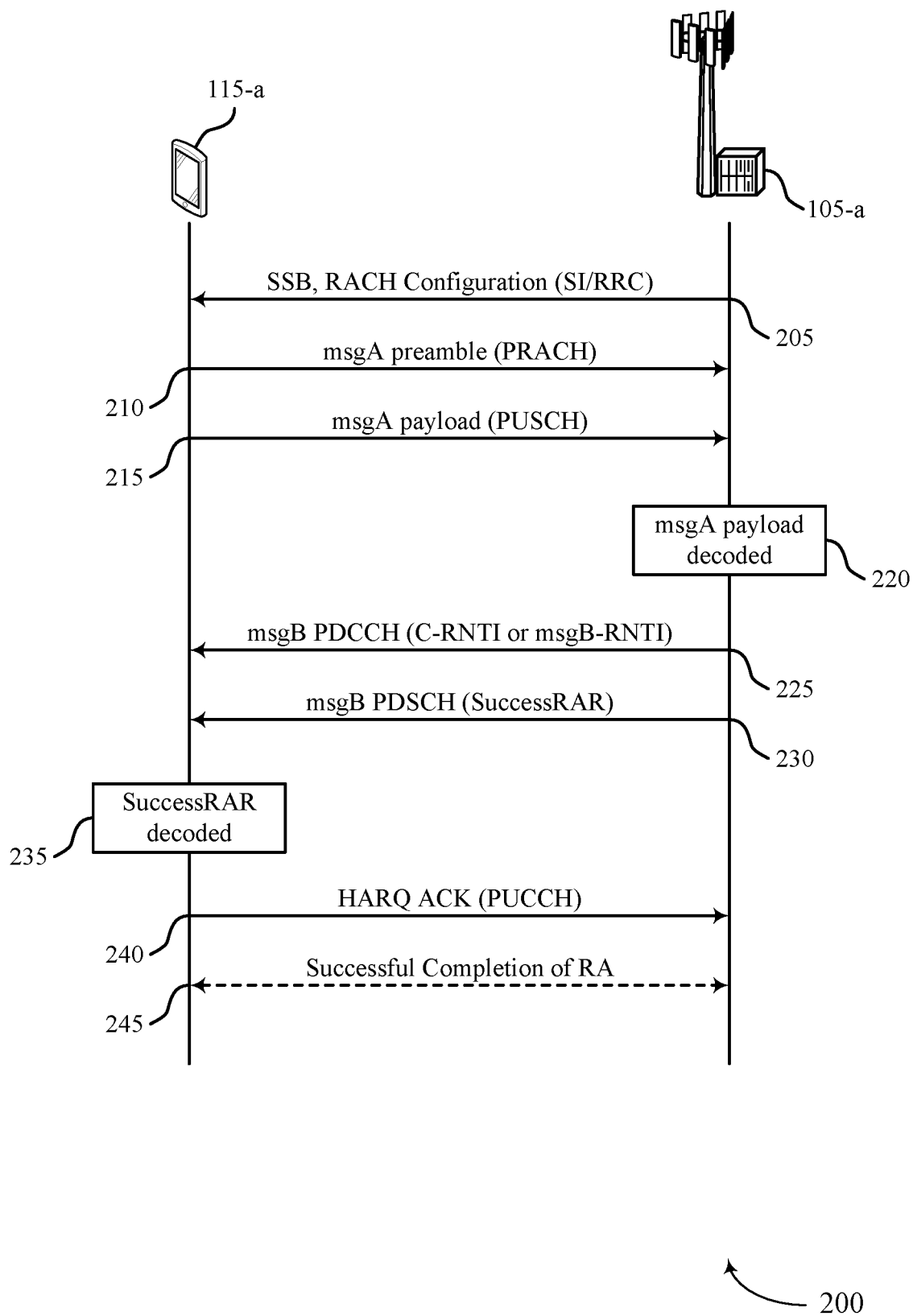
FIGS. 2-4 illustrate examples of process flows that support feedback reporting in a two-step random-access procedure in accordance with aspects of the present disclosure.

FIG. 2 illustrates an example of a process flow 200 for a two-step RACH procedure in accordance with aspects of the present disclosure. Process flow 200 illustrates aspects of techniques performed by a UE 115-a, which may be an example of a UE 115 described with reference to FIG. 1. Process flow 200 also illustrates aspects of techniques performed by a base station 105-a, which may be an example of a base station 105 described with reference to FIG. 1. At 205, base station 105-a may broadcast a synchronization signal block (SSB) received by UE 115-a, and UE 115-a may synchronize to the base station 105-a using the SSB. The base station 105-a may then transmit a RACH configuration to UE 115-*a* in system information (SI) or in RRC signaling, and the UE 115-*a* may use the RACH configuration to perform a two-step random-access procedure.

At 210, UE 115-*a* may transmit a msgA preamble in a physical RACH (PRACH) to base station 105-*a*, and, at 215, UE 115-*a* may transmit a msgA payload in a PUSCH to base station 105-*a*. The UE 115-*a* may transmit the preamble and payload in a first RACH message in a first step of a two-step RACH procedure (e.g., concurrently or in separate time resources). At 220, base station 105-*a* may decode the msgA payload (e.g., preamble and payload). At 225, base station 105-*a* may transmit a msgB PDCCH masked with a C-RNTI or a msgB-RNTI, and, at 230, base station 105-*a* may transmit a msgB PDSCH (e.g., a success RAR). At 235, UE 115-*a* may decode the success RAR, and, at 240, UE 115-*a* may transmit a HARQ ACK in a PUCCH to base station 105-*a*. At 245, once base station 105-*a* receives the HARQ ACK, the RACH procedure may be successfully completed.

Figure 3:
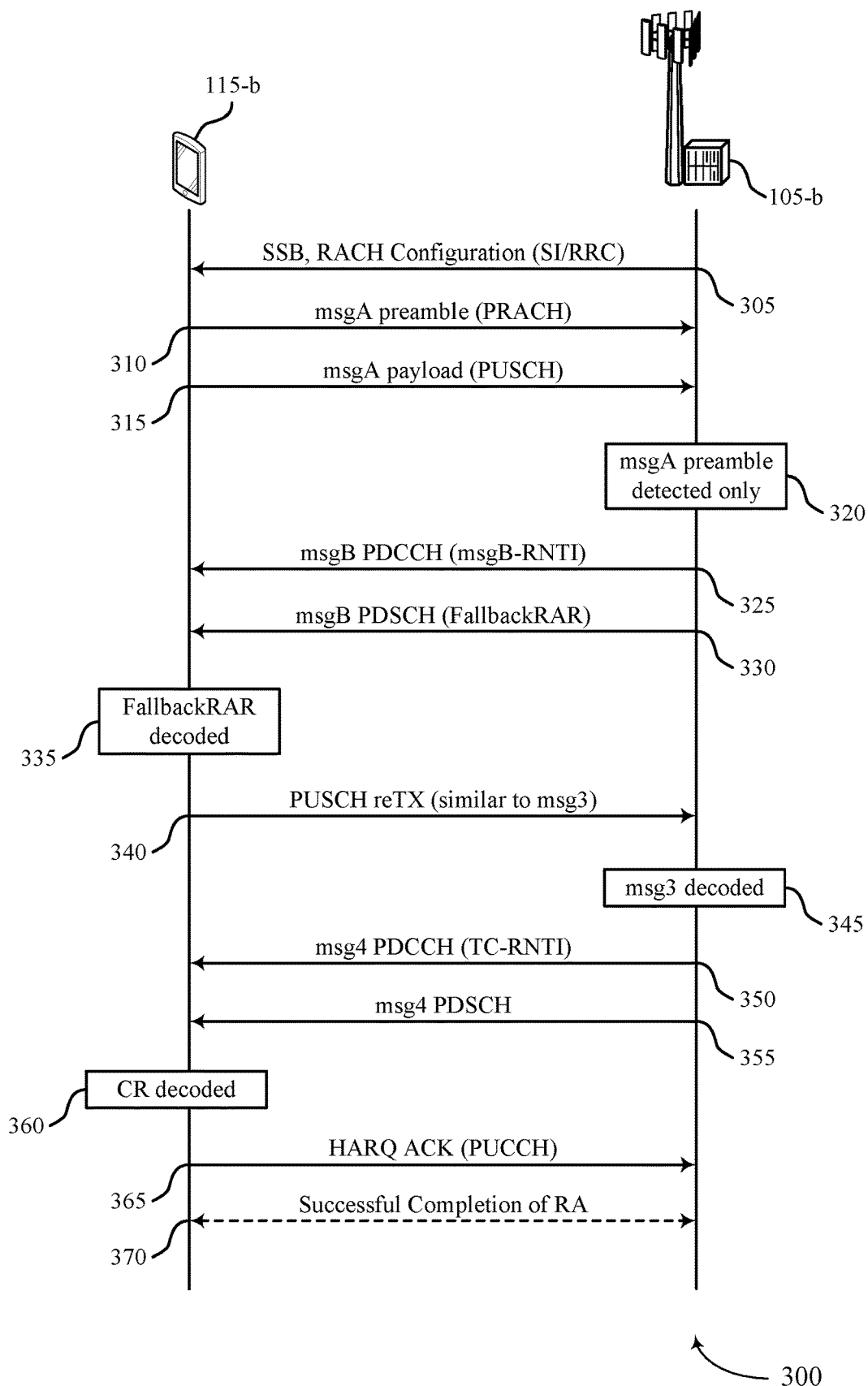

FIG. 3 illustrates an example of a process flow 300 for a two-step RACH procedure in accordance with aspects of the present disclosure. Process flow 300 illustrates aspects of techniques performed by a UE 115-*b*, which may be an example of a UE 115 described with reference to FIG. 1. Process flow 300 also illustrates aspects of techniques performed by a base station 105-*b*, which may be an example of a base station 105 described with reference to FIG. 1. At 305, base station 105-*b* may broadcast an SSB which may be received by UE 115-*b*, and UE 115-*b* may synchronize to the base station 105-*b* using the SSB. The base station 105-*b* may then transmit a RACH configuration to UE 115-*b* in system information or in RRC signaling, and the UE 115-*b* may use the RACH configuration to perform a two-step random-access procedure.

At 310, UE 115-*b* may transmit a msgA preamble in a PRACH to base station 105-*b*, and, at 315, UE 115-*b* may transmit a msgA payload in a PUSCH to base station 105-*b* (concurrently or separated in time). The UE 115-*b* may transmit the preamble and payload in a first RACH message in a first step of a two-step RACH procedure. At 320, base station 105-*b* may detect the msgA preamble and may fail to detect or decode the msgA payload. Thus, at 325, base station 105-*b* may transmit a msgB PDCCH masked with a msgB-RNTI, and, at 330, base station 105-*b* may transmit a msgB PDSCH (e.g., a fallback RAR) based on failing to detect or decode the msgA payload.

At 335, UE 115-*b* may decode the fallback RAR, and, at 340, UE 115-*b* may retransmit the msgA payload in a PUSCH (e.g., similar to a msg3 transmission in a four-step random-access procedure). At 345, base station 105-*b* may decode the retransmitted msgA payload (e.g., msg3). At 350, base station 105-*b* may retransmit a PDCCH (e.g., a message 4 (msg4) PDCCH masked with a temporary C-RNTI (TC-RNTI)) to UE 115-*b*, and, at 355, base station 105-*b* may retransmit a PDSCH (e.g., a msg4 PDSCH) to UE 115-*b*. At 360, UE 115-*b* may decode the retransmitted PDCCH and PDSCH from the base station 105-*b* (e.g., the msg4 including a MAC CE for contention resolution (CR)), and, at 365, UE 115-*b* may transmit a HARQ ACK in a PUCCH to base station 105-*b*. At 370, once base station 105-*b* receives the HARQ ACK, the RACH procedure may be successfully completed.

Figure 4:
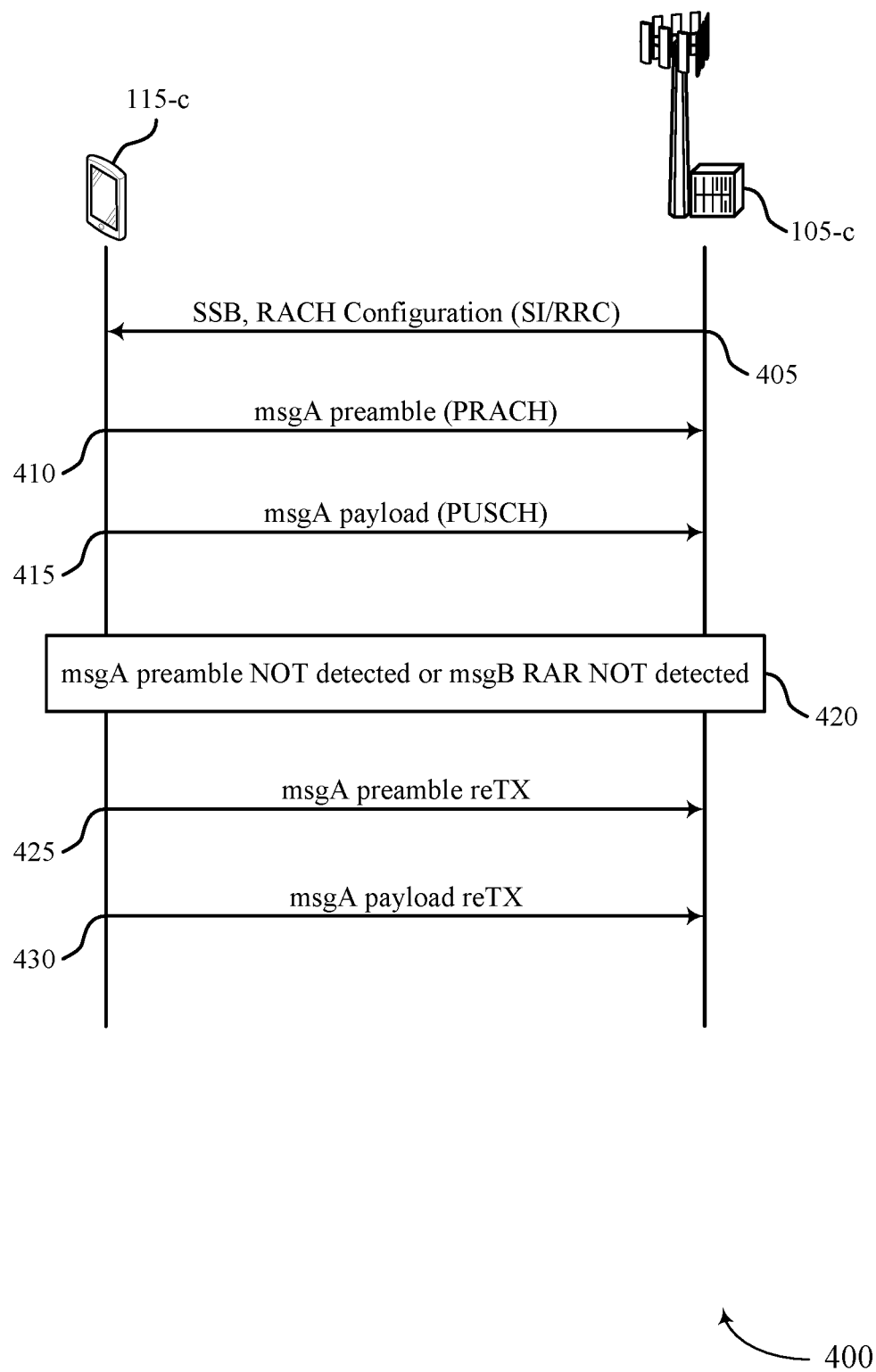

FIG. 4 illustrates an example of a process flow 400 for a two-step RACH procedure in accordance with aspects of the present disclosure. Process flow 400 illustrates aspects of techniques performed by a UE 115-*c*, which may be an example of a UE 115 described with reference to FIG. 1. Process flow 400 also illustrates aspects of techniques performed by a base station 105-*c*, which may be an example of a base station 105 described with reference to FIG. 1. At 405, base station 105-*c* may broadcast an SSB which may be received by UE 115-*c*, and UE 115-*c* may synchronize to the base station 105-*c* using the SSB. The base station 105-*c* may then transmit a RACH configuration to UE 115-*c* in system information or in RRC signaling, and the UE 115-*c* may use the RACH configuration to perform a two-step random-access procedure.

At 410, UE 115-*c* may transmit a msgA preamble in a PRACH to base station 105-*c*, and, at 415, UE 115-*c* may transmit a msgA payload in a PUSCH to base station 105-*c*. The UE 115-*c* may transmit the preamble and payload in a first RACH message in a first step of a two-step RACH procedure. At 420, the base station 105-*c* may not detect the preamble or payload. Alternatively, at 420, the base station 105-*c* may detect the preamble and payload and transmit a msgB RAR, but the UE 115-*c* may fail to detect or decode the msgB RAR. Accordingly, at 425, UE 115-*c* may retransmit the msgA preamble, and, at 430, UE 115-*c* may retransmit the msgA payload. The UE 115-*c* may repeat this process until the UE 115-*c* is able to successfully complete the RACH procedure.

FIG. 5 illustrates an example of content 500 included in a msgB transmission in a two-step RACH procedure in accordance with aspects of the present disclosure. In one example, a base station 105 may successfully decode a msgA payload. In this example, when a UE 115 is in a connected state, the base station 105 may transmit a msgB PDCCH including a CRC masked by a C-RNTI and a DCI with DCI format 1-0. Further, the base station 105 may transmit a msgB PDSCH (e.g., success RAR) including a TA MAC CE and optionally a signaling radio bearer (SRB) RRC message. Alternatively, when a UE 115 is in an inactive or idle state, the base station 105 may transmit a msgB PDCCH including a CRC masked by a msgB-RNTI and a group common (GC) DCI with DCI format 1-0 (e.g., with two reserved bits indicating the least significant bits (LSBs) of a system frame number (SFN)). Further, the base station 105 may transmit a msgB PDSCH (e.g., success RAR) including a TA MAC CE, a CR MAC CE C-RNTI, a transmit power command (TPC) for PUCCH transmissions, a PUCCH resource indication, a PDSCH to HARQ feedback timing indicator, a C-RNTI, and optionally an SRB RRC message. In another example, a base station 105 may successfully detect a msgA preamble and fail to detect or decode a msgA payload. In this example, the base station 105 may transmit a msgB PDCCH including a CRC masked by a msgB-RNTI and a GC DCI with DCI format 1-0. Further, the base station 105 may transmit a msgB PDSCH (e.g., fallback RAR) including a random-access preamble index (RAPID), a TA MAC CE, a RAR grant, and a TC-RNTI.

FIG. 6 illustrates an example of parameters 600 included in DCI of a msgB PDCCH in accordance with aspects of the present disclosure (e.g., where the msgB PDCCH may reuse or repurpose a DCI format 1-0). In example 600-*a*, the DCI may include a one-bit field for an identifier of DCI formats, a variable field for a frequency-domain resource assignment, a four-bit field for a time-domain resource assignment, a one-bit field for a virtual resource block (VRB) to physical resource block (PRB) mapping, a five-bit field for a modulation and coding scheme (MCS), a one-bit field for a new data indicator (NDI), a two-bit field for a redundancy version (RV), a four-bit field for a HARQ process number, a two-bit field for a downlink assignment index (DAI), a two-bit field for a transmit power command (TPC) for PUCCH, a three-bit field for a PUCCH resource indicator, and a three-bit field for a PDSCH to HARQ feedback timing indicator. In example 600-b, the DCI may include a variable field for a frequency-domain resource assignment, a four-bit field for a time-domain resource assignment, a one-bit field for a VRB to PRB mapping, a five-bit field for an MCS, a two-bit field for transport block (TB) scaling, a two-bit field for a LSB of SFN, and 14 reserved bits.

The CRC of the msgB PDCCH including the DCI in example 600-a or example 600-b may be masked by a C-RNTI or msgB-RNTI. For example, a base station 105 may use the C-RNTI to mask the msgB PDCCH when the msgB PDCCH is unicast to a UE 115 in an RRC connected state and when the msgA payload is successfully decoded by the base station 105. In this example, the base station 105 may re-use DCI format 1-0 with CRC masked by C-RNTI for the DCI included in the msgB PDCCH (e.g., as shown in example 600-a). Alternatively, a base station 105 may use the msgB-RNTI to mask the msgB PDCCH when the msgB PDCCH is groupcast to UEs 115 sharing the same RACH occasion (RO) for a two-step RACH procedure. In one example, the base station 105 may use the msgB-RNTI to mask msgB PDCCH transmissions to UEs 115 in an RRC idle or inactive state when the msgA preamble detection or payload decoding is successful at the base station 105. In another example, the base station 105 may use the msgB-RNTI to mask msgB PDCCH transmissions to UEs 115 in an RRC connected state when msgA preamble detection is successful and payload decoding failed. In these examples, the base station 105 may use an updated DCI format (e.g., similar to DCI format 1-0) for the DCI included in the msgB PDCCH (e.g., as shown in example 600-b). The updated DCI format may support a field indicating two LSBs of SFN in addition to a msgB-RNTI masking CRC of the msgB PDCCH.

Figure 7:
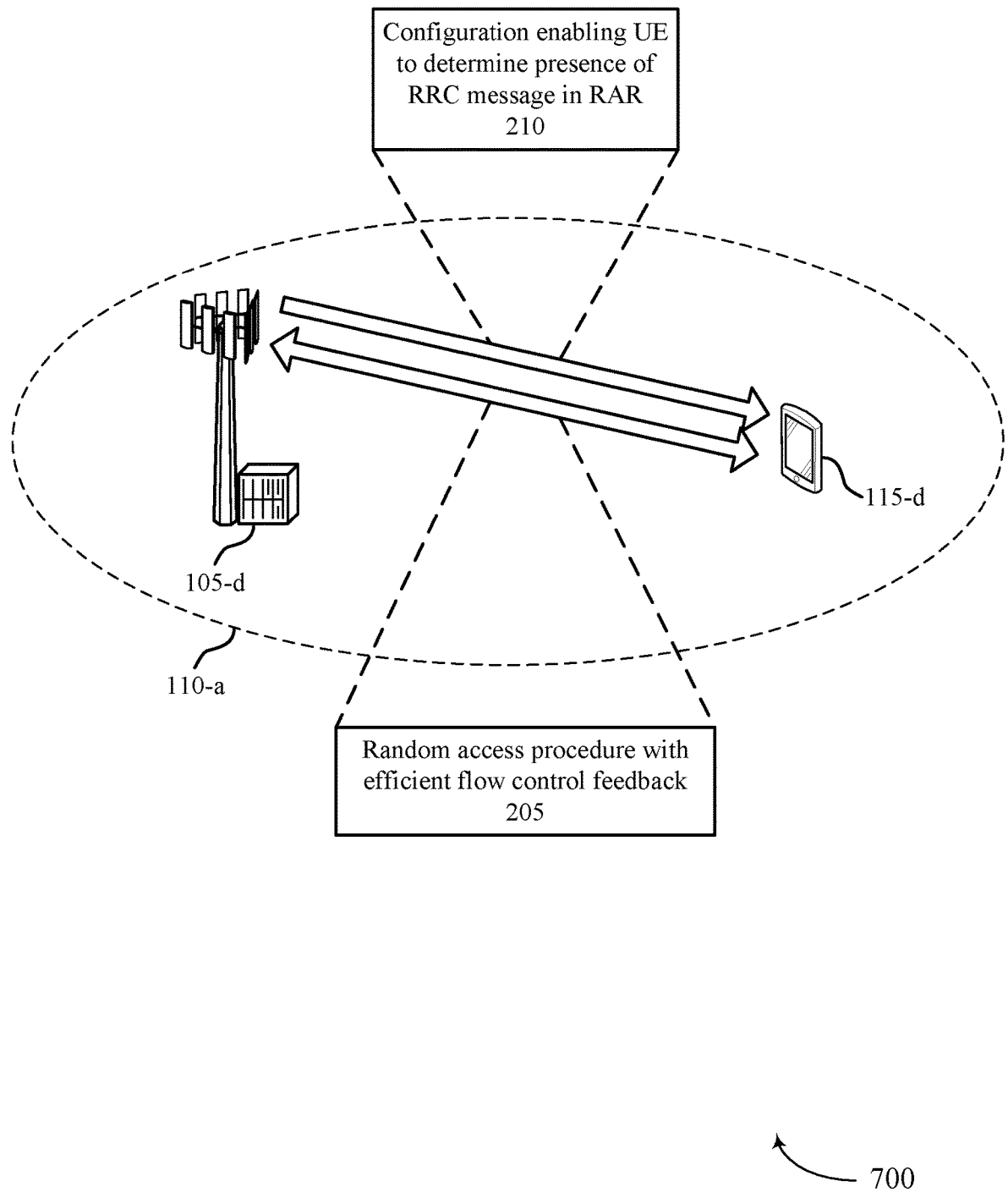
FIG. 7 illustrates an example of a wireless communications system that supports feedback reporting in a two-step random-access procedure in accordance with aspects of the present disclosure.

FIG. 7 illustrates an example of a wireless communications system 700 that supports feedback reporting in a two-step random-access procedure in accordance with aspects of the present disclosure. The wireless communications system 700 includes a UE 115-d, which may be an example of a UE 115 described with reference to FIGS. 1-6. The wireless communications system 700 also includes a base station 105-d, which may be an example of a base station 105 described with reference to FIGS. 1-6. The base station 105-d may provide communication coverage for a coverage area 110-a. The wireless communications system 700 may implement aspects of wireless communications system 100. For example, the wireless communications system 700 may support efficient techniques for managing flow control feedback in a random-access procedure to limit latency, overhead, and power consumption.

In the example of FIG. 7, a UE 115 may initiate a two-step random-access procedure 205 with efficient flow control feedback to establish or re-establish a connection with base station 105-d or to identify suitable parameters or configurations for communicating with base station 105-d. As part of the random-access procedure, the UE 115-d may transmit a random-access message including a preamble and a payload to the base station 105-d. The base station 105-d may receive the random-access message and may transmit a response to the random-access message including a control channel portion and a data channel portion. The base station 105-d may also transmit a configuration 210 enabling the UE 115-d to determine whether the data channel portion of the response includes at least one RRC message. Alternatively, the configuration 210 may be pre-configured at the UE 115-d.

After receiving the response, the UE 115-d may determine whether the data channel portion of the response includes at least one RRC message. For instance, the configuration may indicate a threshold transport block size (TBS), and the UE 115-a may compare the TBS of the data channel portion to the threshold TBS to determine whether the data channel portion includes at least one RRC message. Alternatively, the configuration may be included in the control channel portion of the response and may indicate whether the data channel portion includes at least one RRC message. The UE 115-d may then manage flow control feedback reporting to the base station 105-d based on whether the data channel portion includes at least one RRC message. For instance, the UE 115-d may report an ACK for the response if the data channel portion does not include an RRC message and a TA timer at the UE is running (e.g., regardless of whether the UE is able to or attempts to decode the data channel portion, since the data channel portion may only include TA information which may not be useful to the UE).

Figure 8:
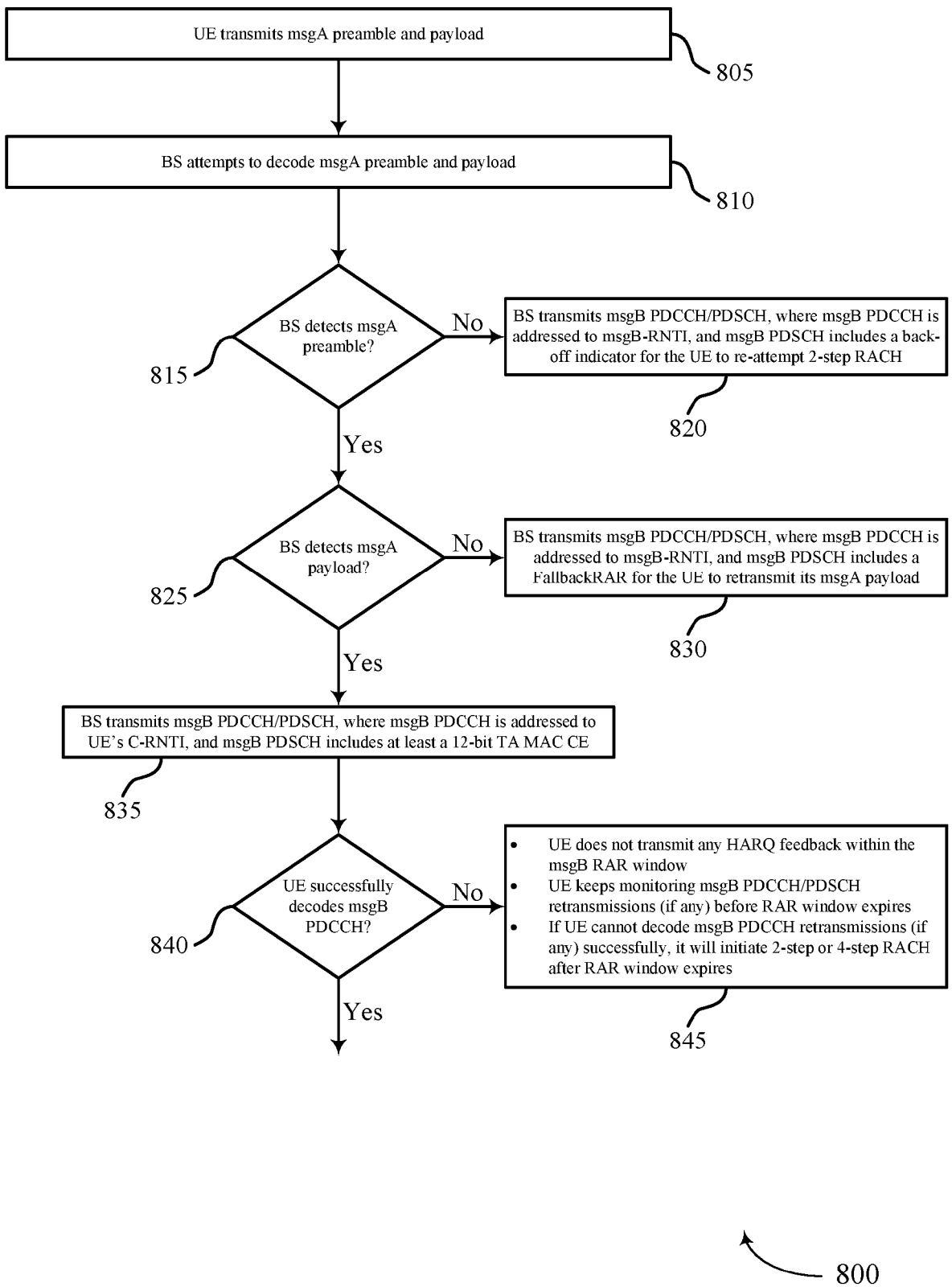
FIGS. 8-10 illustrate examples of flowcharts providing further details on feedback reporting in a two-step random-access procedure in accordance with aspects of the present disclosure.

FIG. 8 illustrates an example of a flowchart 800 providing further details on feedback reporting in a two-step random-access procedure in accordance with aspects of the present disclosure. At 805, a UE 115 may transmit a msgA preamble and payload to a base station 105 in a random-access procedure. At 810, the base station 105 may attempt to decode the msgA preamble and payload. At 815, the base station 105 may determine whether the msgA preamble is detected. At 820, if the base station 105 fails to detect the msgA preamble, the base station 105 may transmit a msgB PDCCH or msgB PDSCH. The msgB PDCCH may be addressed to a msgB-RNTI, and the msgB PDSCH may include a back-off indicator for the UE to re-attempt the two-step RACH procedure. At 825, if the base station 105 detects the msgA preamble, the base station 105 may determine whether the msgA payload is detected. At 830, if the base station 105 fails to detect the msgA payload, the base station 105 may transmit a msgB PDCCH or msgB PDSCH. The msgB PDCCH may be addressed to a msgB-RNTI, and the msgB PDSCH may include a fallback RAR for the UE 115 to retransmit its msgA payload (e.g., similar to a msg3 transmission).

At 835, if the base station 105 detects the msgA payload, the base station 105 may transmit a msgB PDCCH and msgB PDSCH to the UE 115. The msgB PDCCH may be addressed to the C-RNTI of the UE 115 (e.g., specific to the UE 115), and the msgB PDSCH may include at least a TA MAC CE (e.g., which may be 12-bits). At 840, the UE 115 may determine whether the UE 115 was able to successfully decode the msgB PDCCH. At 845, if the UE 115 fails to decode the msgB PDCCH, the UE 115 may avoid transmitting any HARQ feedback within the msgB RAR window. Instead, the UE 115 may continue monitoring for msgB PDCCH or msgB PDSCH retransmissions (if any) before the RAR window expires. If the UE 115 fails to successfully decode msgB PDCCH retransmissions (if any), the UE 115 may initiate a two-step or four-step RACH procedure after the RAR window expires. However, if the UE 115 successfully decodes the msgB PDCCH retransmissions, the UE 115 may continue to the flowchart illustrated in FIG. 9 or the flowchart illustrated in FIG. 10.

Figure 9:
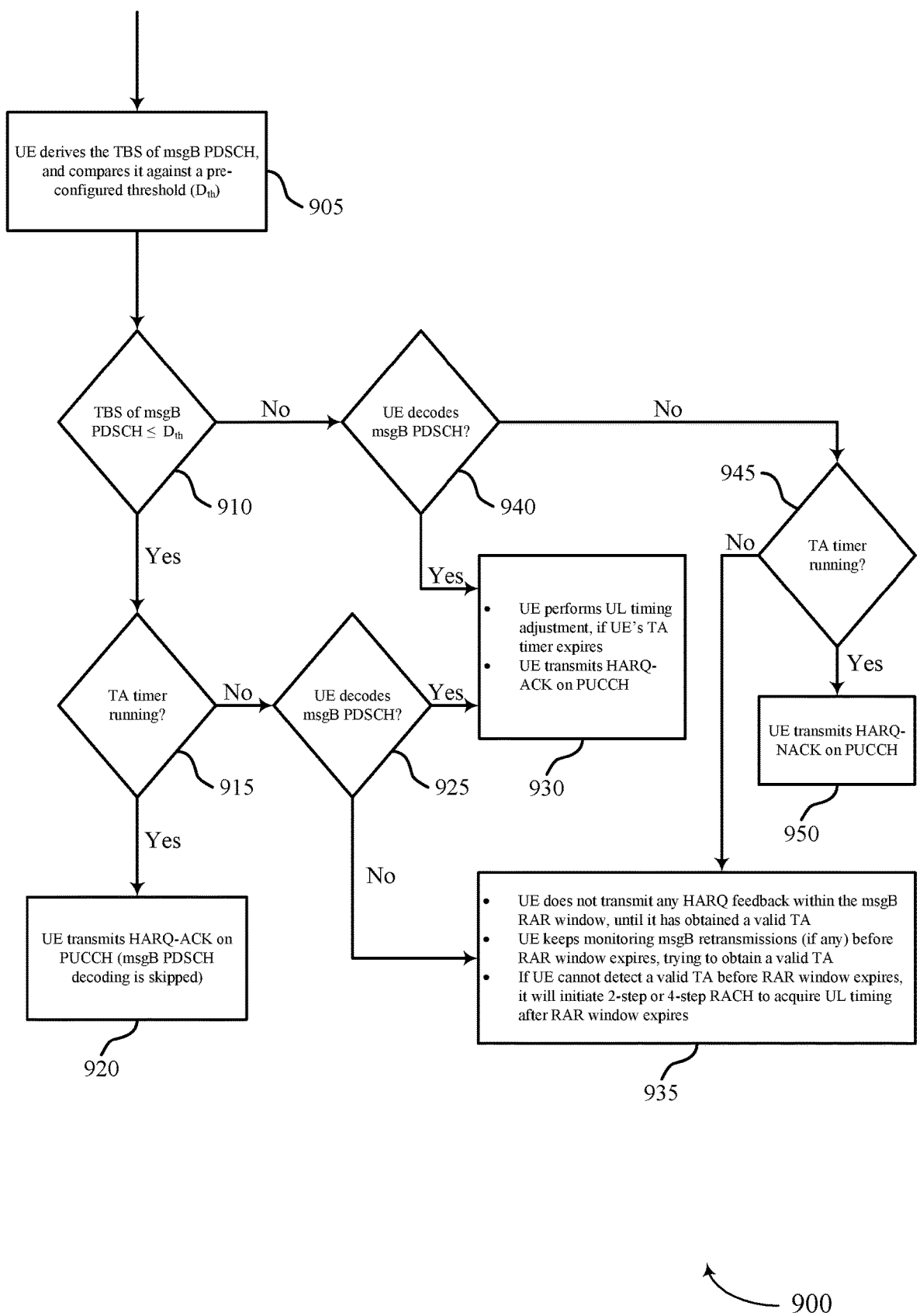
Figure 10:
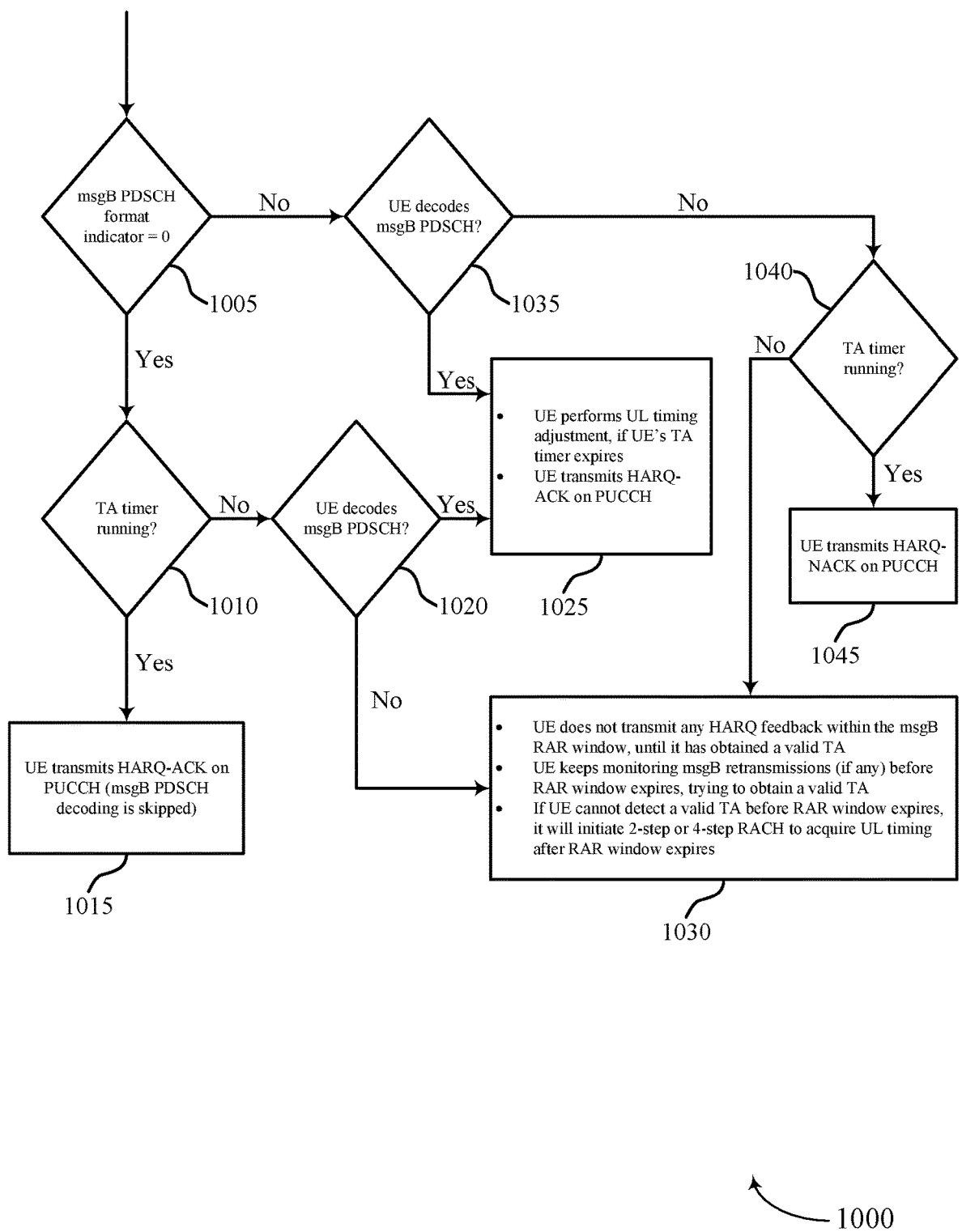

The flowcharts in FIGS. 9 and 10 illustrate examples for efficiently managing flow control feedback in a random-access procedure. In these examples, a UE 115 may determine whether a msgB PDSCH received from a base station 105 in a RAR includes at least one RRC message. The UE 115 may then manage flow control feedback reporting to the base station 105 for the RAR based on whether the msgB PDSCH includes the at least one RRC message. In some cases, the UE 115 may also manage flow control feedback reporting to the base station 105 for the RAR based on whether a TA timer at the UE is running. In particular, the UE 115 may avoid transmitting HARQ feedback to the base station 105 when a TA timer has expired and the UE 115 is unable to perform an uplink timing adjustment (e.g., since the HARQ feedback transmission would be misaligned in time and may result in interference in a wireless communications system).

If the UE 115 determines that a TA timer is running (e.g., the TA timer has been initialized and has not expired), or the UE 115 is able to perform an uplink timing adjustment based on TA information in a msgB PDSCH, the UE 115 may transmit HARQ feedback to the base station 105. In this case, the UE 115 may transmit the HARQ feedback based on a PUCCH resource indicator and a PDSCH to HARQ feedback timing indicator. The UE 115 may receive the PUCCH resource indicator and the PDSCH to HARQ feedback timing indicator in the msgB PDCCH or in dedicated RRC signaling. As described with reference to FIG. 1, the PUCCH resource indicator may indicate the PUCCH resource for the UE 115 to use to transmit HARQ feedback, and the PDSCH to HARQ feedback timing indicator may indicate a number of slots (or other time intervals) between the msgB PDSCH and the HARQ feedback from the UE 115.

Although the flowcharts illustrated in FIGS. 9 and 10 outline the order of different operations performed in a RACH procedure, these operations may be rearranged and performed in different orders. That is, regardless of the order of the operations, the techniques described herein allow a UE 115 to manage flow control feedback in a two-step RACH procedure based on whether a msgB PDSCH includes at least one RRC message, whether a TA timer at the UE is running, or both. Using these techniques, the overhead and latency in a RACH procedure may be reduced since a UE 115 may avoid requesting retransmission of information that the UE 115 may not use. Further, power consumption and complexity at the UE 115 may be limited, since the UE 115 may suppress decoding of a msgB PDSCH when the msgB PDSCH does not include useful information for the UE 115. The UE 115 may also suppress uplink timing adjustment when a TA timer at the UE 115 is running. For example, the UE 115 may skip parsing a TA MAC CE in a msgB PDSCH and skip a timing advance procedure before transmitting an ACK or NACK or any other uplink signals or channels.

FIG. 9 illustrates an example of a flowchart 900 providing further details on feedback reporting in a two-step random-access procedure in accordance with aspects of the present disclosure. In the example of FIG. 9, a UE 115 may determine whether a msgB PDSCH received from a base station 105 in a RAR includes at least one RRC message. In particular, the UE 115 may compare the TBS of the msgB PDSCH to a threshold TBS to determine whether the msgB PDSCH includes the at least one RRC message. The UE 115 may then manage flow control feedback reporting to the base station 105 for the RAR based on whether the msgB PDSCH includes the at least one RRC message.

At 905, after successfully decoding the msgB PDCCH, the UE 115 may derive the TBS of the msgB PDSCH and compare it against a TBS threshold (DO. The TBS threshold may be preconfigured, or may be configured by the base station 105. The UE 115 may derive the TBS of the msgB PDSCH based on parameters included in the msgB PDCCH (e.g., resources, MCS). Then, at 910, the UE 115 may determine whether the TBS of the msgB PDSCH is above, below, or equal to the TBS threshold. If the TBS of the msgB PDSCH is equal to or below the TBS threshold, the UE 115 may determine whether a TA timer at the UE 115 is running at 915. If the TA timer at the UE 115 is running, and the TBS of the msgB PDSCH is below the TBS threshold, the UE 115 may transmit an ACK on a PUCCH at 920. In some cases, the UE 115 may also suppress decoding of the msgB PDSCH (e.g., msgB PDSCH decoding is skipped). Because the msgB PDSCH is determined to not include an RRC message, the msgB PDSCH may only include TA information. However, because the TA timer at the UE 115 is running, the TA information may be redundant for the UE 115, and the UE 115 may suppress an uplink timing adjustment (e.g., the UE 115 may already be time aligned and may not perform an uplink timing adjustment). Thus, whether or not the UE 115 is able to decode the msgB PDSCH, the UE 115 may transmit an ACK to the base station to avoid getting retransmissions of the msgB PDSCH (e.g., retransmissions of redundant information).

At 915, if the UE 115 determines that a TA timer at the UE 115 has expired, it may be appropriate for the UE 115 to perform an uplink timing adjustment. Thus, although the msgB PDSCH may not include an RRC message, at 925, the UE 115 may still attempt to decode the msgB PDSCH for the TA information. If the UE 115 successfully decodes the msgB PDSCH, at 930, the UE 115 may perform an uplink timing adjustment. The UE 115 may then transmit an ACK on a PUCCH to the base station 105. Alternatively, if the UE 115 fails to decode the msgB PDSCH, at 935, the UE 115 may avoid transmitting any HARQ feedback within the msgB RAR window, until the UE 115 has obtained a valid TA (e.g., until the UE 115 successfully decodes a msgB PDSCH retransmission).

The UE 115 may continue monitoring msgB retransmissions (if any) before the RAR window expires in an attempt to obtain a valid TA. The RAR window for msgB may start from the first symbol of the earliest search space for msgB PDCCH. The base station 105 may transmit an indication of the length of the RAR window to the UE 115 in system information (e.g., system information block 1 (SIB1)). That is, the length of the RAR window for msgB may be configured by the network and indicated in SIB1. If the UE 115 fails to detect a valid TA before the RAR window expires, the UE 115 may initiate another two-step or four-step RACH procedure (e.g., retransmit a msgA preamble and payload) to acquire uplink timing after the RAR window expires. If the UE 115 detects a valid TA (e.g., TA MAC CE) in one or more msgB retransmissions, the UE 115 may perform an uplink timing adjustment and transmit an ACK on a PUCCH to the base station 105.

At 910, if the TBS of the msgB PDSCH is above the TBS threshold, the UE 115 may attempt to decode the msgB PDSCH. That is, the UE 115 may determine that the msgB PDSCH includes at least some useful information, and the UE 115 may attempt to decode the msgB PDSCH. At 930, if the UE 115 successfully decodes the msgB PDSCH, the UE 115 may transmit an ACK on a PUCCH to the base station 105. Additionally, if a TA timer at the UE 115 has expired, the UE 115 may perform an uplink timing adjustment based on the TA information included in the msgB PDSCH. In some cases, if a TA timer at the UE 115 is running, the UE 115 may suppress an uplink timing adjustment (e.g., skip parsing a TA MAC CE in the msgB PDSCH and skip a timing advance procedure). If, however, the UE 115 fails to decode the msgB PDSCH, at 945, the UE 115 may determine whether a TA timer is running.

If a TA timer at the UE 115 is running, at 950, the UE 115 may transmit a HARQ NACK on a PUCCH to the base station 105. The HARQ NACK may indicate that the UE 115 failed to decode the msgB PDSCH and that the msgB PDSCH includes useful information for the UE 115. Alternatively, if a TA timer at the UE 115 has expired, the UE 115 may avoid transmitting any HARQ feedback within the msgB RAR window at 935, until the UE 115 has obtained a valid TA (e.g., until the UE 115 successfully decodes a msgB PDSCH retransmission). The UE 115 may continue monitoring msgB retransmissions (if any) before the RAR window expires in an attempt to obtain a valid TA. If the UE 115 fails to detect a valid TA before the RAR window expires, the UE 115 may initiate another two-step or four-step RACH procedure to acquire uplink timing after the RAR window expires. If the UE 115 detects a valid TA (e.g., TA MAC CE) in one or more msgB retransmissions, the UE 115 may perform an uplink timing adjustment and transmit an ACK on a PUCCH to the base station 105.

FIG. 10 illustrates an example of a flowchart 1000 providing further details on feedback reporting in a two-step random-access procedure in accordance with aspects of the present disclosure. In the example of FIG. 9, a UE 115 may determine whether a msgB PDSCH received from a base station 105 in a RAR includes at least one RRC message. In particular, the UE 115 may receive an indication in the msgB PDCCH of whether the msgB PDSCH includes the at least one RRC message. The UE 115 may then manage flow control feedback reporting to the base station 105 for the RAR based on whether the msgB PDSCH includes the at least one RRC message.

In some cases, an updated DCI format may be specified for DCI included in msgB PDCCH, and the updated DCI format may have a field (e.g., a msgB PDSCH format indicator) for indicating whether a msgB PDSCH scheduled by the msgB PDCCH includes at least one RRC message (e.g., RRC messages multiplexed with a TA MAC CE). The size of the updated DCI format may be the same as a previous DCI format (e.g., DCI format 1-0) from which the updated DCI format may be based (e.g., to reduce blind decoding complexity at a UE 115). In particular, the msgB PDSCH format indicator may be mapped to unused, shortened, or repurposed fields of a previous DCI format. In one example, the size of an MCS field may be reduced (e.g., from five bits to four bits), and the additional bit may be used for the msgB PDSCH format indicator. In another example, the size of a HARQ process number field may be reduced (e.g., from four bits to two or three bits), and the additional bit may be used for the msgB PDSCH format indicator. In yet another example, a DAI field may be repurposed for control signaling information such as the msgB PDSCH format indicator. Further, the updated DCI format may include a CRC scrambled by a C-RNTI of a receiving UE 115.

At 1005, after successfully decoding the msgB PDCCH, the UE 115 may determine whether the msgB PDSCH includes at least one RRC message based on the indication received from the base station 105 (e.g., the msgB PDSCH format indicator). If the msgB PDSCH format indicator indicates that the msgB PDSCH does not include at least one RRC message (e.g., the indicator is set to zero), the UE 115 may determine whether a TA timer at the UE 115 is running at 1010. If the TA timer at the UE 115 is running, and the msgB PDSCH format indicator indicates that the msgB PDSCH does not include at least one RRC message, the UE 115 may transmit an ACK on a PUCCH at 1015. In some cases, the UE 115 may also suppress decoding of the msgB PDSCH (e.g., msgB PDSCH decoding is skipped). Because the msgB PDSCH is determined to not include an RRC message, the msgB PDSCH may only include TA information. However, because the TA timer at the UE 115 is running, the TA information may be redundant for the UE 115, and the UE 115 may suppress an uplink timing adjustment (e.g., the UE 115 may already be time aligned and may not perform an uplink timing adjustment). Thus, whether or not the UE 115 is able to decode the msgB PDSCH, the UE 115 may transmit an ACK to the base station to avoid getting retransmissions of the msgB PDSCH (e.g., retransmissions of redundant information).

At 1010, if the UE 115 determines that a TA timer at the UE 115 has expired, it may be appropriate for the UE 115 to perform an uplink timing adjustment. Thus, although the msgB PDSCH may not include an RRC message, at 1020, the UE 115 may still attempt to decode the msgB PDSCH for the TA information. If the UE 115 successfully decodes the msgB PDSCH, at 1025, the UE 115 may perform an uplink timing adjustment. The UE 115 may then transmit an ACK on a PUCCH to the base station 105. Alternatively, if the UE 115 fails to decode the msgB PDSCH, at 1030, the UE 115 may avoid transmitting any HARQ feedback within the msgB RAR window, until the UE 115 has obtained a valid TA (e.g., until the UE 115 successfully decodes a msgB PDSCH retransmission).

The UE 115 may continue monitoring msgB retransmissions (if any) before the RAR window expires in an attempt to obtain a valid TA. The RAR window for msgB may start from the first symbol of the earliest search space for msgB PDCCH. The base station 105 may transmit an indication of the length of the RAR window to the UE 115 in system information (e.g., system information block 1 (SIB1)). That is, the length of the RAR window for msgB may be configured by the network and indicated in SIB1. If the UE 115 fails to detect a valid TA before the RAR window expires, the UE 115 may initiate another two-step or four-step RACH procedure (e.g., retransmit a msgA preamble and payload) to acquire uplink timing after the RAR window expires. If the UE 115 detects a valid TA (e.g., TA MAC CE) in one or more msgB retransmissions, the UE 115 may perform an uplink timing adjustment and transmit an ACK on a PUCCH to the base station 105.

At 1005, if the msgB PDSCH format indicator indicates that the msgB PDSCH includes at least one RRC message (e.g., the indicator is set to one), the UE 115 may attempt to decode the msgB PDSCH at 1035. That is, the UE 115 may determine that the msgB PDSCH includes at least some useful information, and the UE 115 may attempt to decode the msgB PDSCH. At 1025, if the UE 115 successfully decodes the msgB PDSCH, the UE 115 may transmit an ACK on a PUCCH to the base station 105. Additionally, if a TA timer at the UE 115 has expired, the UE 115 may perform an uplink timing adjustment based on the TA information included in the msgB PDSCH. In some cases, if a TA timer at the UE 115 is running, the UE 115 may suppress an uplink timing adjustment (e.g., skip parsing a TA MAC CE in the msgB PDSCH and skip a timing advance procedure). If, however, the UE 115 fails to decode the msgB PDSCH, at 1040, the UE 115 may determine whether a TA timer is running.

If a TA timer at the UE 115 is running, at 1045, the UE 115 may transmit a HARQ NACK on a PUCCH to the base station 105. The HARQ NACK may indicate that the UE 115 failed to decode the msgB PDSCH and that the msgB PDSCH includes useful information for the UE 115. Alternatively, if a TA timer at the UE 115 has expired, at 1030, the UE 115 may avoid transmitting any HARQ feedback within the msgB RAR window, until the UE 115 has obtained a valid TA (e.g., until the UE 115 successfully decodes a msgB PDSCH retransmission). The UE 115 may continue monitoring msgB retransmissions (if any) before the RAR window expires in an attempt to obtain a valid TA. If the UE 115 fails to detect a valid TA before the RAR window expires, the UE 115 may initiate another two-step or four-step RACH procedure to acquire uplink timing after the RAR window expires. If the UE 115 detects a valid TA (e.g., TA MAC CE) in one or more msgB retransmissions, the UE 115 may perform an uplink timing adjustment and transmit an ACK on a PUCCH to the base station 105.

Figure 11:
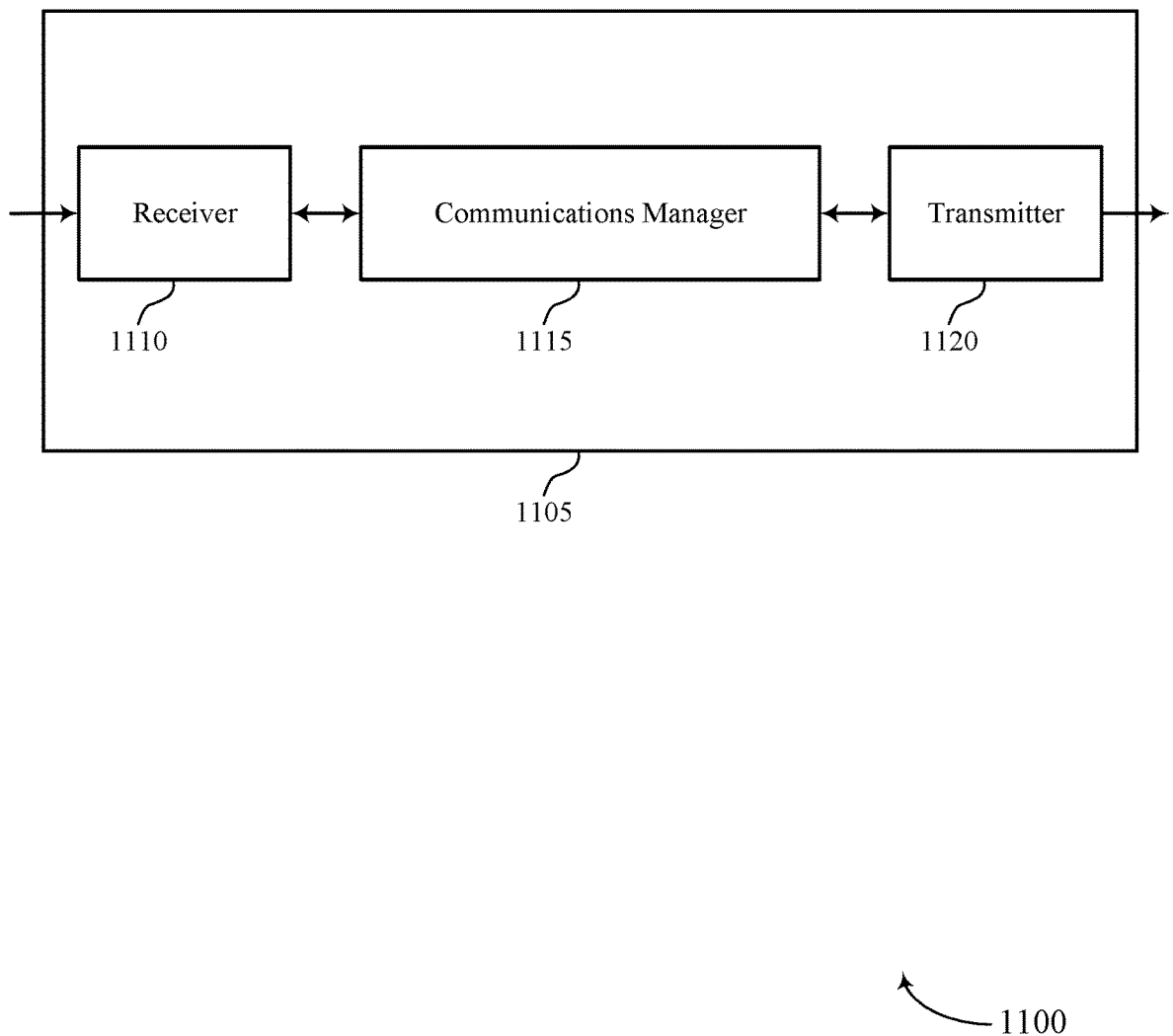
FIGS. 11 and 12 show block diagrams of devices that support feedback reporting in a two-step random-access procedure in accordance with aspects of the present disclosure.

FIG. 11 shows a block diagram 1100 of a device 1105 that supports feedback reporting in a two-step random-access procedure in accordance with aspects of the present disclosure. The device 1105 may be an example of aspects of a UE 115 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to feedback reporting in a two-step random-access procedure, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may transmit, to a base station as part of a random-access procedure, a random-access message including a preamble and a payload, receive, from the base station, at least a control channel portion of a response to the random-access message, where the response includes the control channel portion and a data channel portion, determine, based on at least one parameter of the control channel portion, whether the data channel portion includes at least one radio resource control message, and manage flow control feedback reporting for the response based on the determining. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
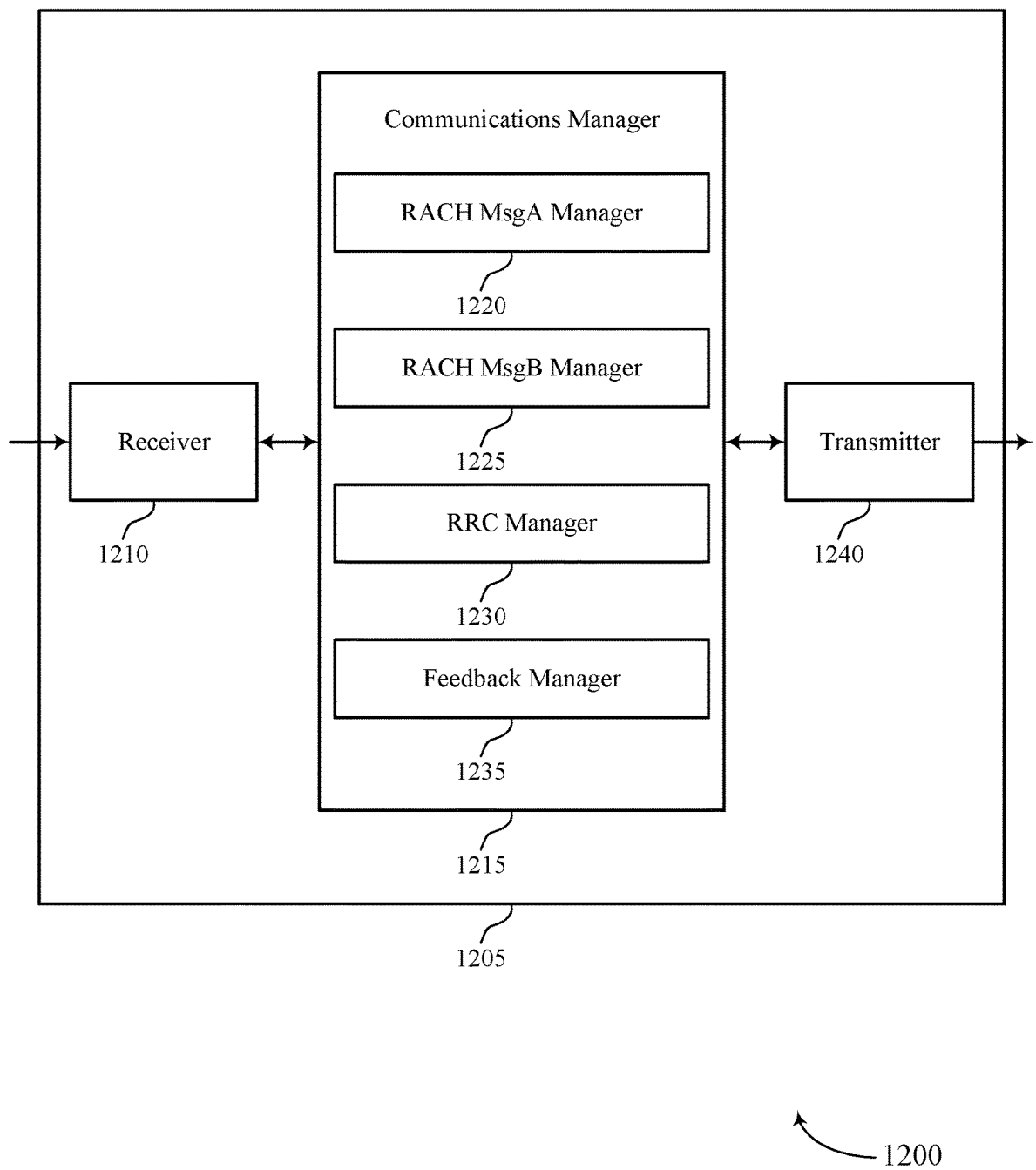

FIG. 12 shows a block diagram 1200 of a device 1205 that supports feedback reporting in a two-step random-access procedure in accordance with aspects of the present disclosure. The device 1205 may be an example of aspects of a device 1105, or a UE 115 as described herein. The device 1205 may include a receiver 1210, a communications manager 1215, and a transmitter 1240. The device 1205 may also include a processor. Each of these components may be in communication with one another (e.g., via one or more buses).

The receiver 1210 may receive information such as packets, user data, or control information associated with various information channels (e.g., control channels, data channels, and information related to feedback reporting in a two-step random-access procedure, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a RACH msgA manager 1220, a RACH msgB manager 1225, a RRC manager 1230, and a feedback manager 1235. The communications manager 1215 may be an example of aspects of the communications manager 1410 described herein.

The RACH msgA manager 1220 may transmit, to a base station as part of a random-access procedure, a random-access message including a preamble and a payload. The RACH msgB manager 1225 may receive, from the base station, at least a control channel portion of a response to the random-access message, where the response includes the control channel portion and a data channel portion. The RRC manager 1230 may determine, based on at least one parameter of the control channel portion, whether the data channel portion includes at least one radio resource control message. The feedback manager 1235 may manage flow control feedback reporting for the response based on the determining.

The transmitter 1240 may transmit signals generated by other components of the device 1205. In some examples, the transmitter 1240 may be collocated with a receiver 1210 in a transceiver module. For example, the transmitter 1240 may be an example of aspects of the transceiver 1420 described with reference to FIG. 14. The transmitter 1240 may utilize a single antenna or a set of antennas.

Figure 13:
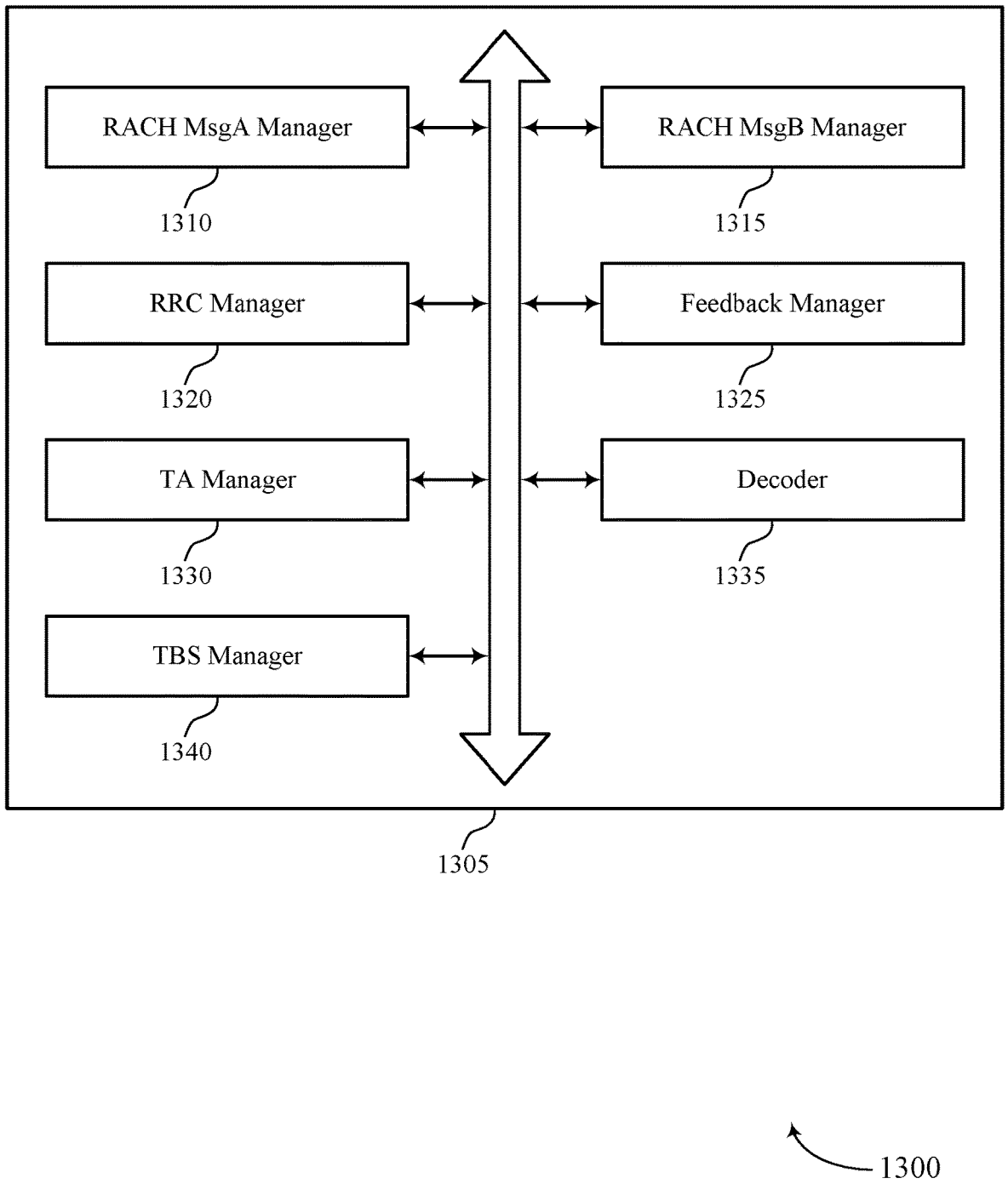
FIG. 13 shows a block diagram of a communications manager that supports feedback reporting in a two-step random-access procedure in accordance with aspects of the present disclosure.

FIG. 13 shows a block diagram 1300 of a communications manager 1305 that supports feedback reporting in a two-step random-access procedure in accordance with aspects of the present disclosure. The communications manager 1305 may be an example of aspects of a communications manager 1115, a communications manager 1215, or a communications manager 1410 described herein. The communications manager 1305 may include a RACH msgA manager 1310, a RACH msgB manager 1315, a RRC manager 1320, a feedback manager 1325, a TA manager 1330, a decoder 1335, and a TBS manager 1340. Each of these modules may communicate, directly or indirectly, with one another (e.g., via one or more buses).

The RACH msgA manager 1310 may transmit, to a base station as part of a random-access procedure, a random-access message including a preamble and a payload. The RACH msgB manager 1315 may receive, from the base station, at least a control channel portion of a response to the random-access message, where the response includes the control channel portion and a data channel portion. In some examples, the RACH msgB manager 1315 may monitor for a retransmission of the response to the random-access message to identify the timing advance information before a response window expires, where the response window starts from a first symbol of an earliest search space set for the control channel portion of the response, and a duration of the response window is configured by the base station and indicated in system information.

In some examples, the RACH msgB manager 1315 may monitor for a retransmission of the response to the random-access message including the at least one radio resource control message and the timing advance information. In some examples, the RACH msgB manager 1315 may transmit, to the base station, flow control feedback in accordance with the resource indicator and the feedback timing indicator. In some cases, the data channel portion includes at least timing advance information for uplink timing adjustment and optionally the at least one radio resource control message, where the timing advance information is derived based on the preamble of the random-access message and the at least one radio resource control message.

The RRC manager 1320 may determine, based on at least one parameter of the control channel portion, whether the data channel portion includes at least one radio resource control message. In some examples, the RRC manager 1320 may determine that the data channel portion does not include the at least one radio resource control message. In some examples, the RRC manager 1320 may determine that the data channel portion includes the at least one radio resource control message. In some examples, the RRC manager 1320 may determine that the data channel portion does not include the at least one radio resource control message based on the transport block size of the data channel portion being equal to or below the threshold transport block size. In some examples, the RRC manager 1320 may determine that the data channel portion includes the at least one radio resource control message based on the transport block size of the data channel portion being above the threshold transport block size. In some cases, the at least one parameter of the control channel portion includes an explicit indication of whether the data channel portion includes the at least one radio resource control message.

The feedback manager 1325 may manage flow control feedback reporting for the response based on the determining. In some examples, the feedback manager 1325 may transmit, to the base station, a flow control acknowledgment for the response based on determining that the data channel portion does not include the at least one radio resource control message. In some examples, the feedback manager 1325 may transmit, to the base station, a flow control acknowledgment for the response after performing the uplink timing adjustment based on successfully decoding the data channel portion. In some examples, the feedback manager 1325 may transmit, to the base station, a flow control acknowledgment for the response based on successfully decoding the data channel portion. In some examples, the feedback manager 1325 may transmit, to the base station, a flow control negative acknowledgment for the response based on failing to decode the data channel portion. In some examples, the feedback manager 1325 may receive, from the base station, a resource indicator and a feedback timing indicator for the flow control feedback reporting in the control channel portion or in dedicated radio resource control signaling.

The TA manager 1330 may determine that a timing advance timer at the UE is running. In some examples, the TA manager 1330 may suppress an uplink timing adjustment based on determining that the timing advance timer at the UE is running. In some examples, the TA manager 1330 may determine that a timing advance timer at the UE has expired. In some examples, the TA manager 1330 may obtain the timing advance information from the successfully decoded data channel. In some examples, the TA manager 1330 may perform the uplink timing adjustment using the timing advance information. In some examples, the TA manager 1330 may fail to obtain the timing advance information from the data channel. In some examples, the TA manager 1330 may perform the uplink timing adjustment using the timing advance information based on determining that the timing advance timer at the UE has expired. In some examples, the TA manager 1330 may determine that a timing advance timer at the UE is running. In some examples, the TA manager 1330 may suppress the uplink timing adjustment based on determining that the timing advance timer at the UE is running. In some examples, the TA manager 1330 may suppress the uplink timing adjustment based on the determining.

The decoder 1335 may suppress decoding of the data channel portion based on determining that the timing advance timer at the UE is running and that the data channel portion does not include the at least one radio resource control message. In some examples, the decoder 1335 may perform a decoding process on the data channel portion based on determining that the timing advance timer at the UE has expired. In some examples, the decoder 1335 may successfully decode the data channel portion to identify timing advance information for uplink timing adjustment. In some examples, the decoder 1335 may fail to decode the data channel portion to identify timing advance information for uplink timing adjustment. In some examples, the decoder 1335 may perform a decoding process on the data channel portion based on determining that the data channel portion includes the at least one radio resource control message. In some examples, the decoder 1335 may successfully decode the data channel portion to identify the at least one radio resource control message and timing advance information for uplink timing adjustment. In some examples, the decoder 1335 may fail to decode the data channel portion to identify the at least one radio resource control message and timing advance information for uplink timing adjustment.

The TBS manager 1340 may determine a transport block size of the data channel portion based on the at least one parameter. In some examples, the TBS manager 1340 may compare the transport block size of the data channel portion to a threshold transport block size. In some examples, the TBS manager 1340 may determine that the transport block size of the data channel portion is equal to or below the threshold transport block size based on the comparing. In some examples, the TBS manager 1340 may determine that the transport block size of the data channel portion is above the threshold transport block size based on the comparing. In some examples, the TBS manager 1340 may receive, from the base station, an indication of the threshold transport block size in system information or radio resource control signaling.

Figure 14:
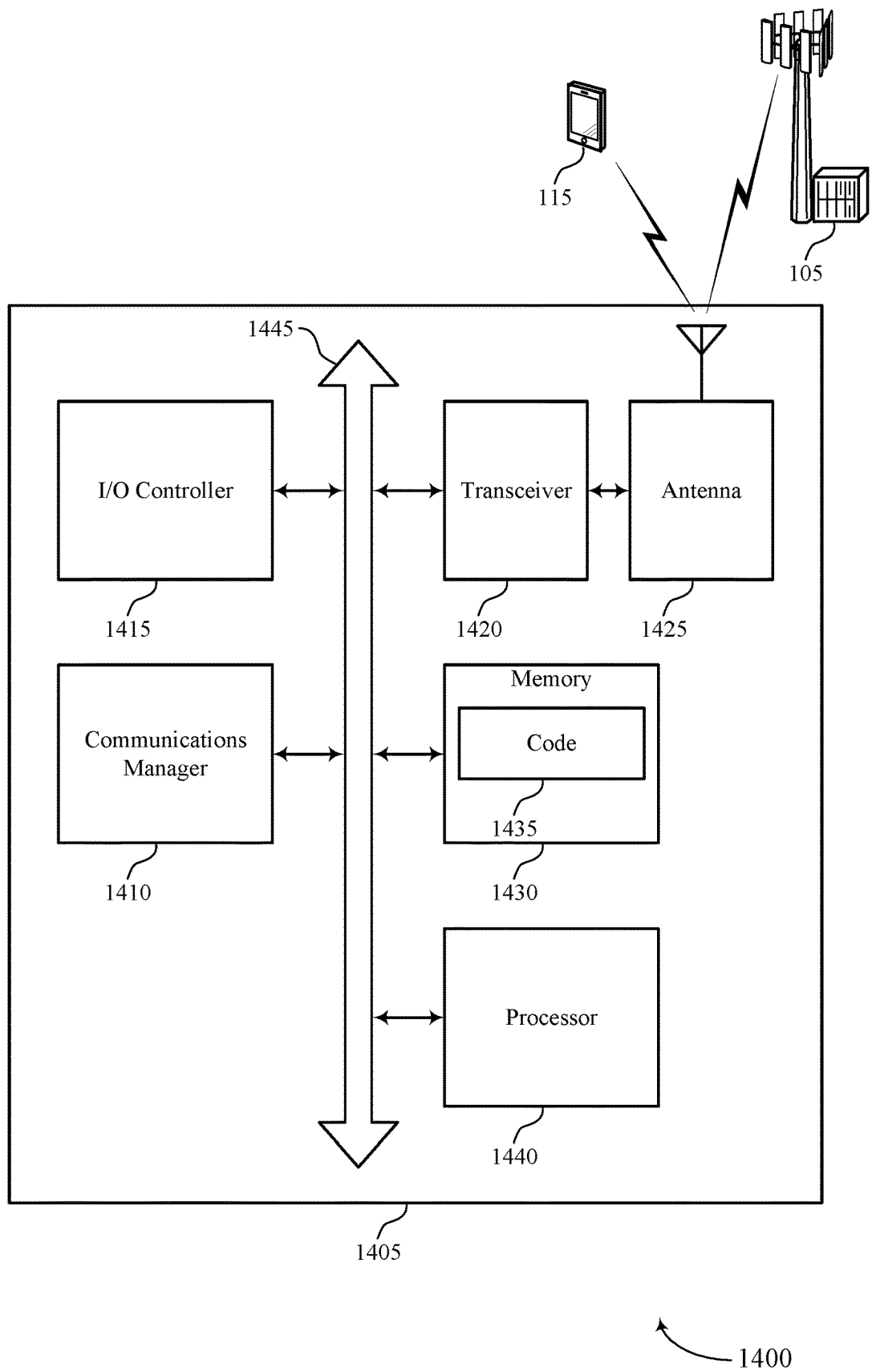
FIG. 14 shows a diagram of a system including a device that supports feedback reporting in a two-step random-access procedure in accordance with aspects of the present disclosure.

FIG. 14 shows a diagram of a system 1400 including a device 1405 that supports feedback reporting in a two-step random-access procedure in accordance with aspects of the present disclosure. The device 1405 may be an example of or include the components of device 1105, device 1205, or a UE 115 as described herein. The device 1405 may include components for bi-directional voice and data communications including components for transmitting and receiving communications, including a communications manager 1410, an I/O controller 1415, a transceiver 1420, an antenna 1425, memory 1430, and a processor 1440. These components may be in electronic communication via one or more buses (e.g., bus 1445).

The communications manager 1410 may transmit, to a base station as part of a random-access procedure, a random-access message including a preamble and a payload, receive, from the base station, at least a control channel portion of a response to the random-access message, where the response includes the control channel portion and a data channel portion, determine, based on at least one parameter of the control channel portion, whether the data channel portion includes at least one radio resource control message, and manage flow control feedback reporting for the response based on the determining.

The I/O controller 1415 may manage input and output signals for the device 1405. The I/O controller 1415 may also manage peripherals not integrated into the device 1405. In some cases, the I/O controller 1415 may represent a physical connection or port to an external peripheral. In some cases, the I/O controller 1415 may utilize an operating system such as iOS®, ANDROID®, MS-DOS®, MS-WINDOWS®, OS/2®, UNIX®, LINUX®, or another known operating system. In other cases, the I/O controller 1415 may represent or interact with a modem, a keyboard, a mouse, a touchscreen, or a similar device. In some cases, the I/O controller 1415 may be implemented as part of a processor. In some cases, a user may interact with the device 1405 via the I/O controller 1415 or via hardware components controlled by the I/O controller 1415.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM and ROM. The memory 1430 may store computer-readable, computer-executable code 1435 including instructions that, when executed, cause the processor to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting feedback reporting in a two-step random-access procedure).

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
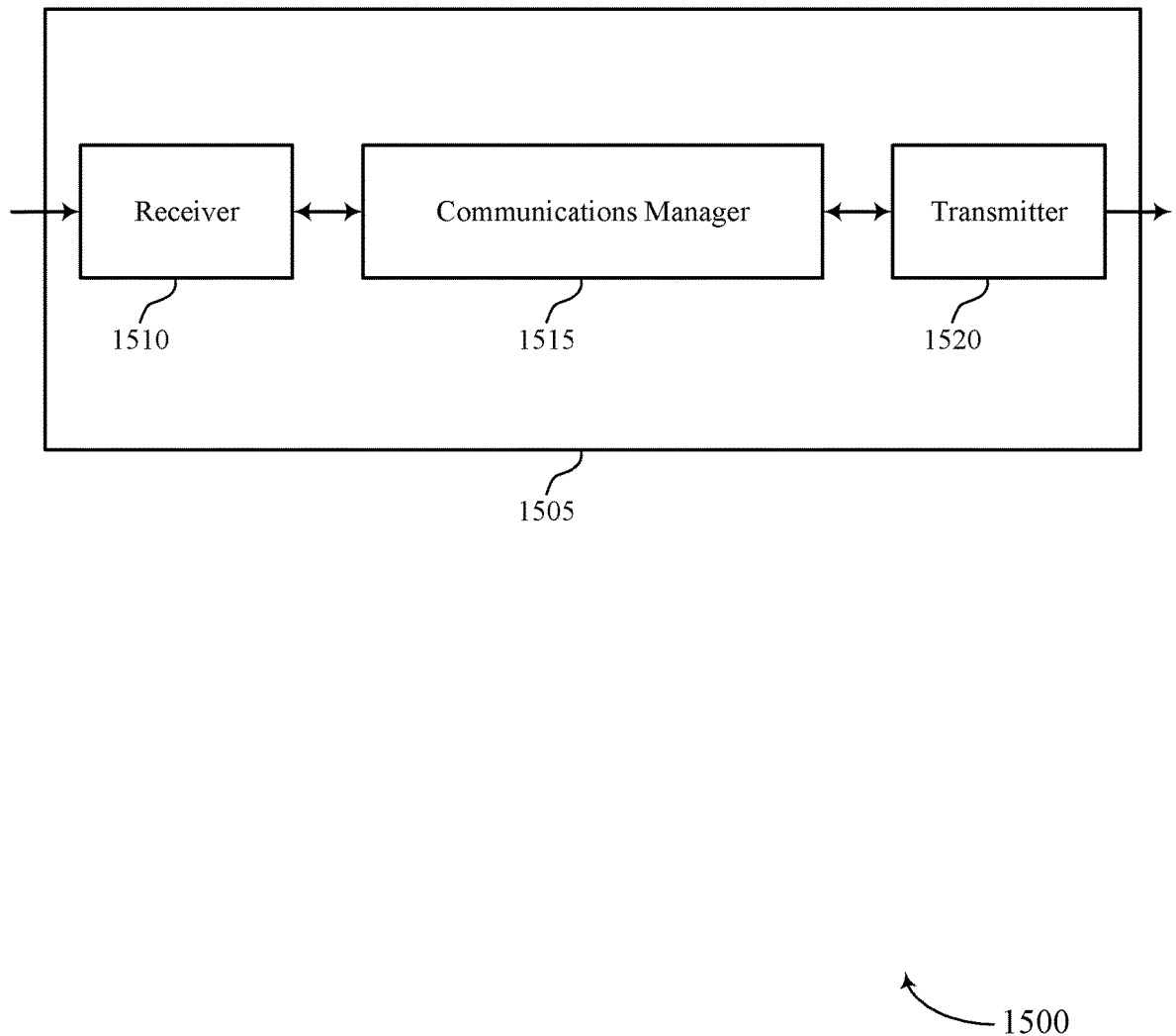
FIGS. 15 and 16 show block diagrams of devices that support feedback reporting in a two-step random-access procedure in accordance with aspects of the present disclosure.

FIG. 15 shows a block diagram 1500 of a device 1505 that supports feedback reporting in a two-step random-access procedure in accordance with aspects of the present disclosure. The device 1505 may be an example of aspects of a base station 105 as described herein. The device 1505 may include a receiver 1510, a communications manager 1515, and a transmitter 1520. The device 1505 may also include a processor. Each of these components may be in communication with one another (e.g., via one or more buses).

The receiver 1510 may receive information such as packets, user data, or control information associated with various information channels (e.g., control channels, data channels, and information related to feedback reporting in a two-step random-access procedure, etc.). Information may be passed on to other components of the device 1505. The receiver 1510 may be an example of aspects of the transceiver 1820 described with reference to FIG. 18. The receiver 1510 may utilize a single antenna or a set of antennas.

The communications manager 1515 may receive, from a UE as part of a random-access procedure, a random-access message including a preamble and a payload, transmit, to the UE, a response to the random-access message including a control channel portion and a data channel portion, transmit, to the UE, a configuration enabling the UE to determine whether the data channel portion includes at least one radio resource control message, and monitor for flow control feedback from the UE for the response to the random-access message. The communications manager 1515 may be an example of aspects of the communications manager 1810 described herein.

The communications manager 1515, or its sub-components, may be implemented in hardware, code (e.g., software or firmware) executed by a processor, or any combination thereof. If implemented in code executed by a processor, the functions of the communications manager 1515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1515, or its sub-components, may be physically located at various positions, including being distributed such that portions of functions are implemented at different physical locations by one or more physical components. In some examples, the communications manager 1515, or its sub-components, may be a separate and distinct component in accordance with various aspects of the present disclosure. In some examples, the communications manager 1515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1520 may transmit signals generated by other components of the device 1505. In some examples, the transmitter 1520 may be collocated with a receiver 1510 in a transceiver module. For example, the transmitter 1520 may be an example of aspects of the transceiver 1820 described with reference to FIG. 18. The transmitter 1520 may utilize a single antenna or a set of antennas.

Figure 16:
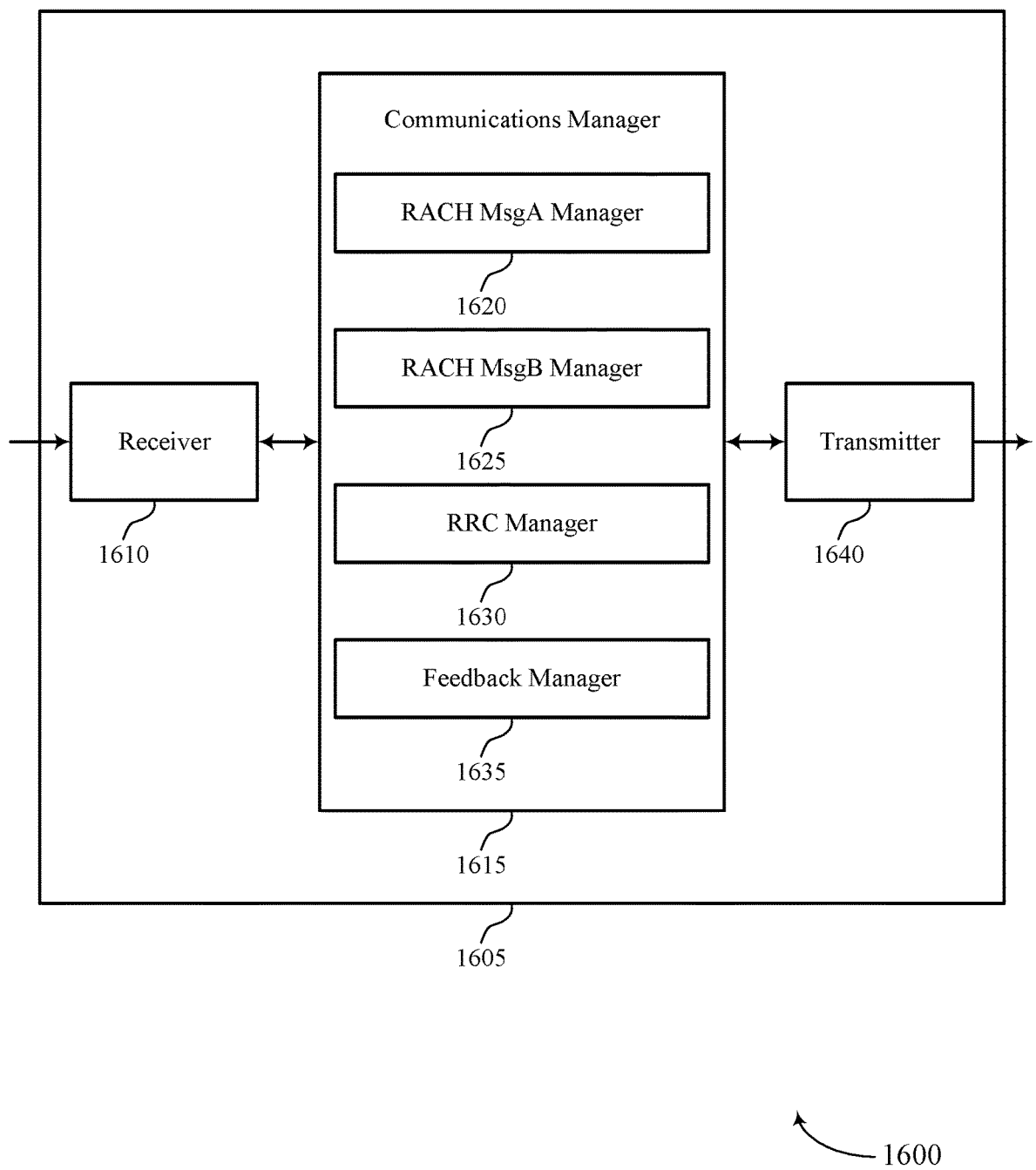

FIG. 16 shows a block diagram 1600 of a device 1605 that supports feedback reporting in a two-step random-access procedure in accordance with aspects of the present disclosure. The device 1605 may be an example of aspects of a device 1505, or a base station 105 as described herein. The device 1605 may include a receiver 1610, a communications manager 1615, and a transmitter 1640. The device 1605 may also include a processor. Each of these components may be in communication with one another (e.g., via one or more buses).

The receiver 1610 may receive information such as packets, user data, or control information associated with various information channels (e.g., control channels, data channels, and information related to feedback reporting in a two-step random-access procedure, etc.). Information may be passed on to other components of the device 1605. The receiver 1610 may be an example of aspects of the transceiver 1820 described with reference to FIG. 18. The receiver 1610 may utilize a single antenna or a set of antennas.

The communications manager 1615 may be an example of aspects of the communications manager 1515 as described herein. The communications manager 1615 may include a RACH msgA manager 1620, a RACH msgB manager 1625, a RRC manager 1630, and a feedback manager 1635. The communications manager 1615 may be an example of aspects of the communications manager 1810 described herein.

The RACH msgA manager 1620 may receive, from a UE as part of a random-access procedure, a random-access message including a preamble and a payload. The RACH msgB manager 1625 may transmit, to the UE, a response to the random-access message including a control channel portion and a data channel portion. The RRC manager 1630 may transmit, to the UE, a configuration enabling the UE to determine whether the data channel portion includes at least one radio resource control message. The feedback manager 1635 may monitor for flow control feedback from the UE for the response to the random-access message.

The transmitter 1640 may transmit signals generated by other components of the device 1605. In some examples, the transmitter 1640 may be collocated with a receiver 1610 in a transceiver module. For example, the transmitter 1640 may be an example of aspects of the transceiver 1820 described with reference to FIG. 18. The transmitter 1640 may utilize a single antenna or a set of antennas.

Figure 17:
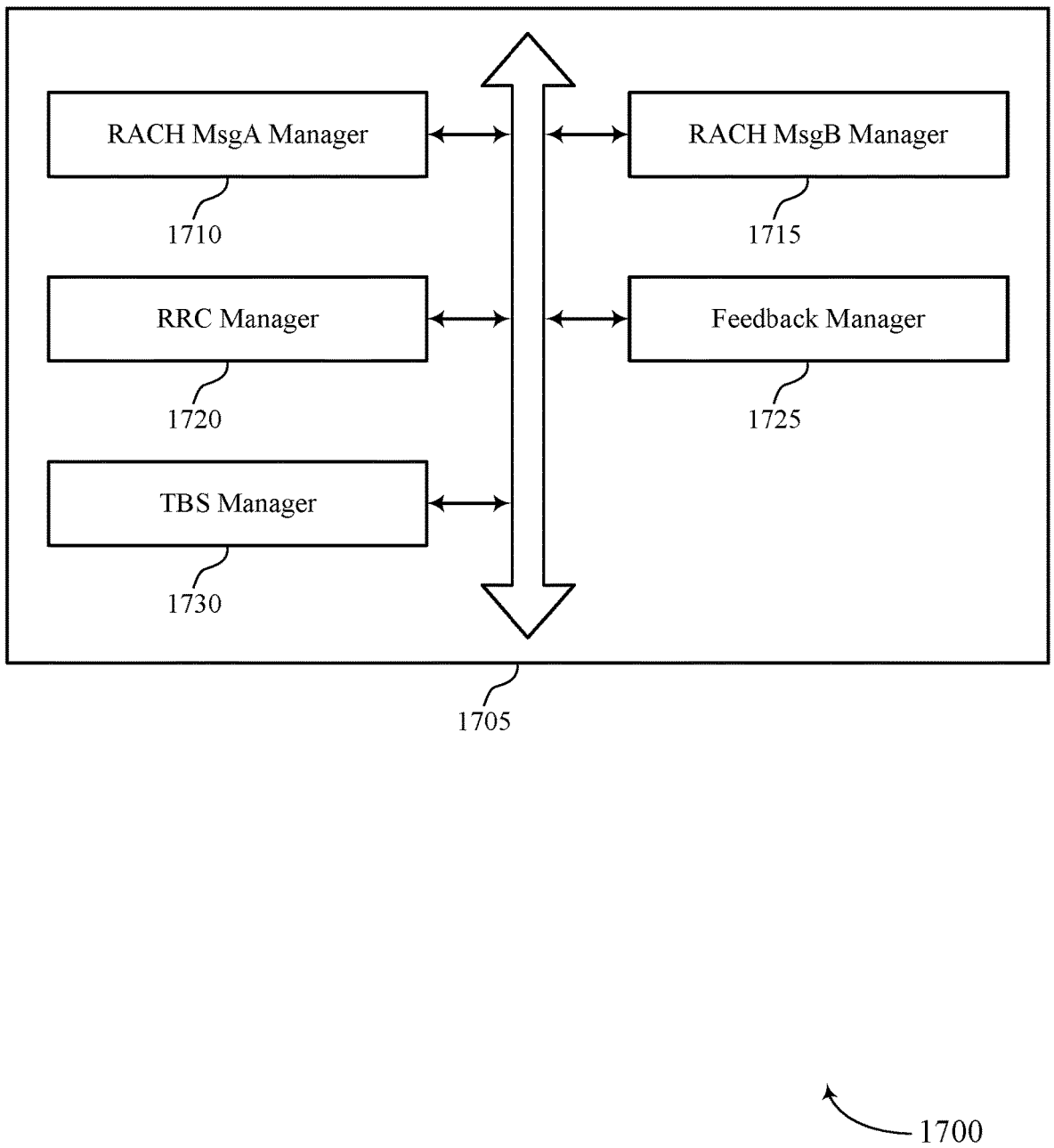
FIG. 17 shows a block diagram of a communications manager that supports feedback reporting in a two-step random-access procedure in accordance with aspects of the present disclosure.

FIG. 17 shows a block diagram 1700 of a communications manager 1705 that supports feedback reporting in a two-step random-access procedure in accordance with aspects of the present disclosure. The communications manager 1705 may be an example of aspects of a communications manager 1515, a communications manager 1615, or a communications manager 1810 described herein. The communications manager 1705 may include a RACH msgA manager 1710, a RACH msgB manager 1715, a RRC manager 1720, a feedback manager 1725, and a TBS manager 1730. Each of these modules may communicate, directly or indirectly, with one another (e.g., via one or more buses).

The RACH msgA manager 1710 may receive, from a UE as part of a random-access procedure, a random-access message including a preamble and a payload. The RACH msgB manager 1715 may transmit, to the UE, a response to the random-access message including a control channel portion and a data channel portion. In some cases, the data channel portion includes at least timing advance information for uplink timing adjustment and optionally the at least one radio resource control message. The RRC manager 1720 may transmit, to the UE, a configuration enabling the UE to determine whether the data channel portion includes at least one radio resource control message. In some examples, the RRC manager 1720 may transmit, in the control channel, an explicit indication of whether the data channel portion includes the at least one radio resource control message.

The feedback manager 1725 may monitor for flow control feedback from the UE for the response to the random-access message. In some examples, the feedback manager 1725 may transmit, to the UE, a resource indicator and a feedback timing indicator for the flow control feedback reporting in the control channel portion or in dedicated radio resource control signaling. In some examples, the feedback manager 1725 may receive, from the UE, flow control feedback in accordance with the resource indicator and the feedback timing indicator. The TBS manager 1730 may transmit, to the UE, an indication of a threshold transport block size for the data channel portion, where a transport block size above the threshold transport block size indicates that the data channel portion includes the at least one radio resource control message, and a transport block size equal to or below the threshold transport block size indicates that the data channel portion does not include the at least one radio resource control message.

Figure 18:
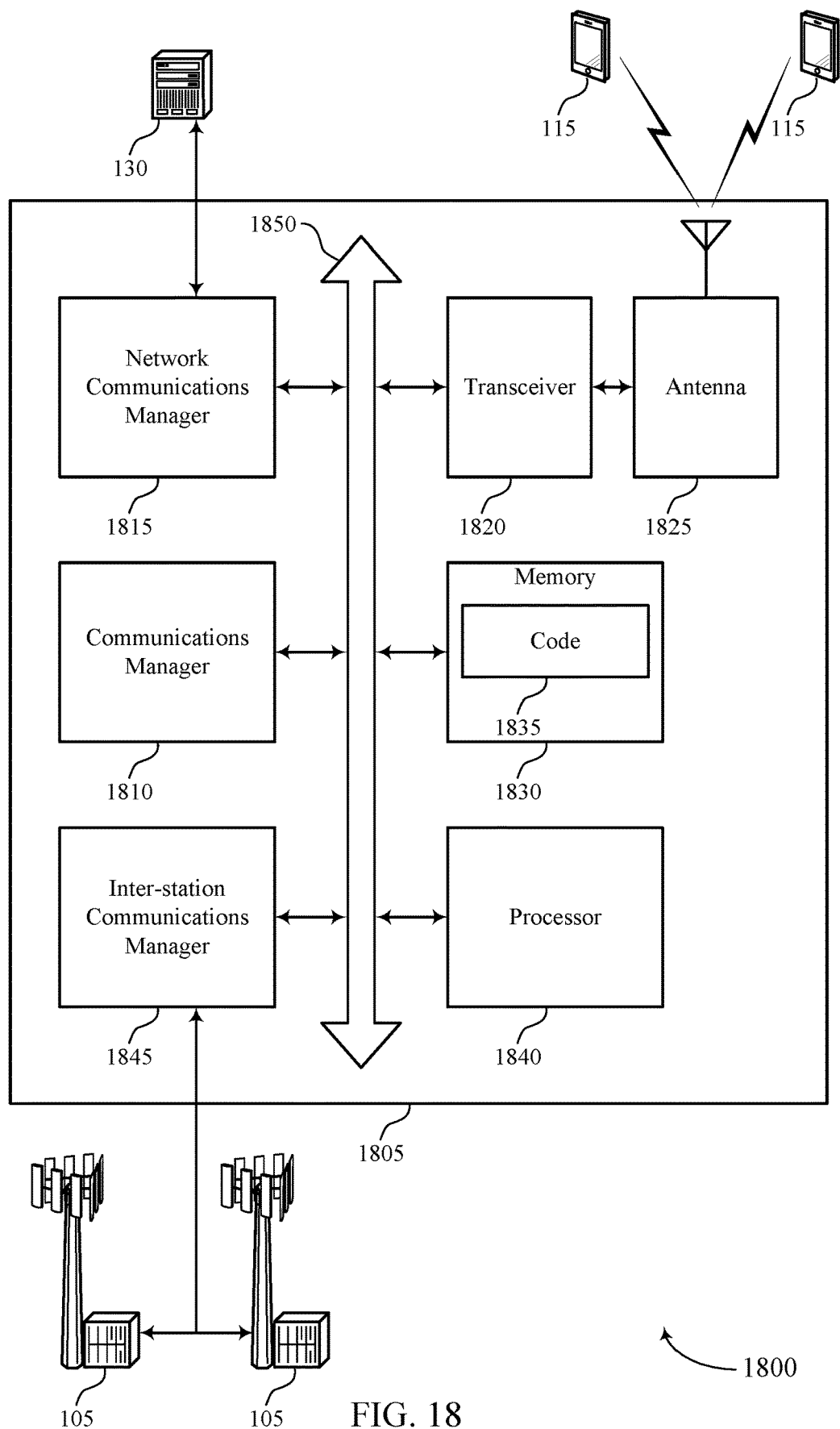
FIG. 18 shows a diagram of a system including a device that supports feedback reporting in a two-step random-access procedure in accordance with aspects of the present disclosure.

FIG. 18 shows a diagram of a system 1800 including a device 1805 that supports feedback reporting in a two-step random-access procedure in accordance with aspects of the present disclosure. The device 1805 may be an example of or include the components of device 1505, device 1605, or a base station 105 as described herein. The device 1805 may include components for bi-directional voice and data communications including components for transmitting and receiving communications, including a communications manager 1810, a network communications manager 1815, a transceiver 1820, an antenna 1825, memory 1830, a processor 1840, and an inter-station communications manager 1845. These components may be in electronic communication via one or more buses (e.g., bus 1850).

The communications manager 1810 may receive, from a UE as part of a random-access procedure, a random-access message including a preamble and a payload, transmit, to the UE, a response to the random-access message including a control channel portion and a data channel portion, transmit, to the UE, a configuration enabling the UE to determine whether the data channel portion includes at least one radio resource control message, and monitor for flow control feedback from the UE for the response to the random-access message.

The network communications manager 1815 may manage communications with the core network (e.g., via one or more wired backhaul links). For example, the network communications manager 1815 may manage the transfer of data communications for client devices, such as one or more UEs 115.

The transceiver 1820 may communicate bi-directionally, via one or more antennas, wired, or wireless links as described above. For example, the transceiver 1820 may represent a wireless transceiver and may communicate bi-directionally with another wireless transceiver. The transceiver 1820 may also include a modem to modulate the packets and provide the modulated packets to the antennas for transmission, and to demodulate packets received from the antennas.

In some cases, the wireless device may include a single antenna 1825. However, in some cases the device may have more than one antenna 1825, which may be capable of concurrently transmitting or receiving multiple wireless transmissions.

The memory 1830 may include RAM, ROM, or a combination thereof. The memory 1830 may store computer-readable code 1835 including instructions that, when executed by a processor (e.g., the processor 1840) cause the device to perform various functions described herein. In some cases, the memory 1830 may contain, among other things, a BIOS which may control basic hardware or software operation such as the interaction with peripheral components or devices.

The processor 1840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1840 may be configured to operate a memory array using a memory controller. In some cases, a memory controller may be integrated into processor 1840. The processor 1840 may be configured to execute computer-readable instructions stored in a memory (e.g., the memory 1830) to cause the device 1805 to perform various functions (e.g., functions or tasks supporting feedback reporting in a two-step random-access procedure).

The inter-station communications manager 1845 may manage communications with other base station 105, and may include a controller or scheduler for controlling communications with UEs 115 in cooperation with other base stations 105. For example, the inter-station communications manager 1845 may coordinate scheduling for transmissions to UEs 115 for various interference mitigation techniques such as beamforming or joint transmission. In some examples, the inter-station communications manager 1845 may provide an X2 interface within an LTE/LTE-A wireless communication network technology to provide communication between base stations 105.

The code 1835 may include instructions to implement aspects of the present disclosure, including instructions to support wireless communications. The code 1835 may be stored in a non-transitory computer-readable medium such as system memory or other type of memory. In some cases, the code 1835 may not be directly executable by the processor 1840 but may cause a computer (e.g., when compiled and executed) to perform functions described herein.

Figure 19:
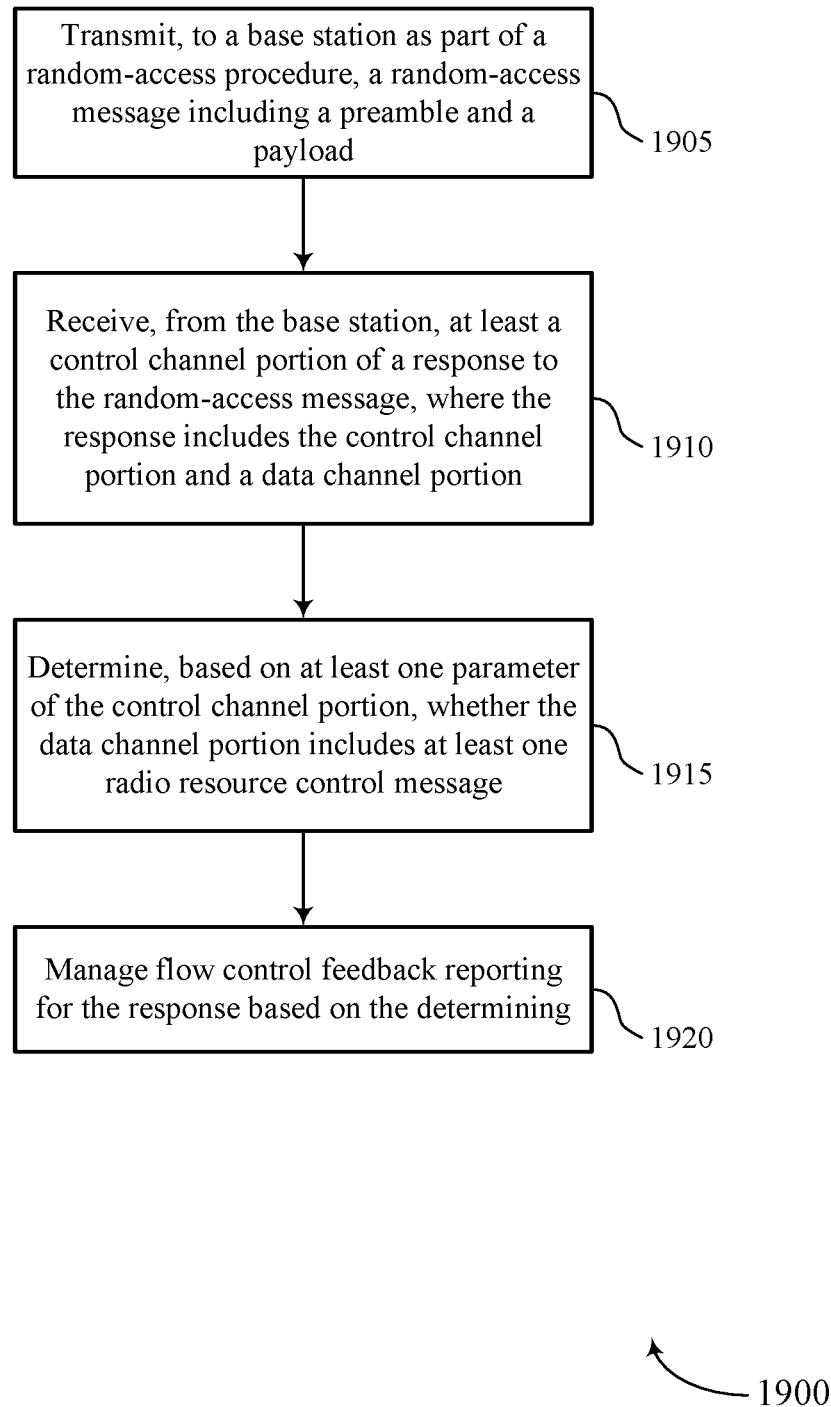
FIGS. 19 and 20 show flowcharts illustrating methods that support feedback reporting in a two-step random-access procedure in accordance with aspects of the present disclosure.

FIG. 19 shows a flowchart illustrating a method 1900 that supports feedback reporting in a two-step random-access procedure in accordance with aspects of the present disclosure. The operations of method 1900 may be implemented by a UE 115 or its components as described herein. For example, the operations of method 1900 may be performed by a communications manager as described with reference to FIGS. 11 through 14. In some examples, a UE may execute a set of instructions to control the functional elements of the UE to perform the functions described below. Additionally, or alternatively, a UE may perform aspects of the functions described below using special-purpose hardware.

At 1905, the UE may transmit, to a base station as part of a random-access procedure, a random-access message including a preamble and a payload. The operations of 1905 may be performed according to the methods described herein. In some examples, aspects of the operations of 1905 may be performed by a RACH msgA manager as described with reference to FIGS. 11 through 14.

At 1910, the UE may receive, from the base station, at least a control channel portion of a response to the random-access message, where the response includes the control channel portion and a data channel portion. The operations of 1910 may be performed according to the methods described herein. In some examples, aspects of the operations of 1910 may be performed by a RACH msgB manager as described with reference to FIGS. 11 through 14.

At 1915, the UE may determine, based on at least one parameter of the control channel portion, whether the data channel portion includes at least one radio resource control message. The operations of 1915 may be performed according to the methods described herein. In some examples, aspects of the operations of 1915 may be performed by a RRC manager as described with reference to FIGS. 11 through 14.

At 1920, the UE may manage flow control feedback reporting for the response based on the determining. The operations of 1920 may be performed according to the methods described herein. In some examples, aspects of the operations of 1920 may be performed by a feedback manager as described with reference to FIGS. 11 through 14.

Figure 20:
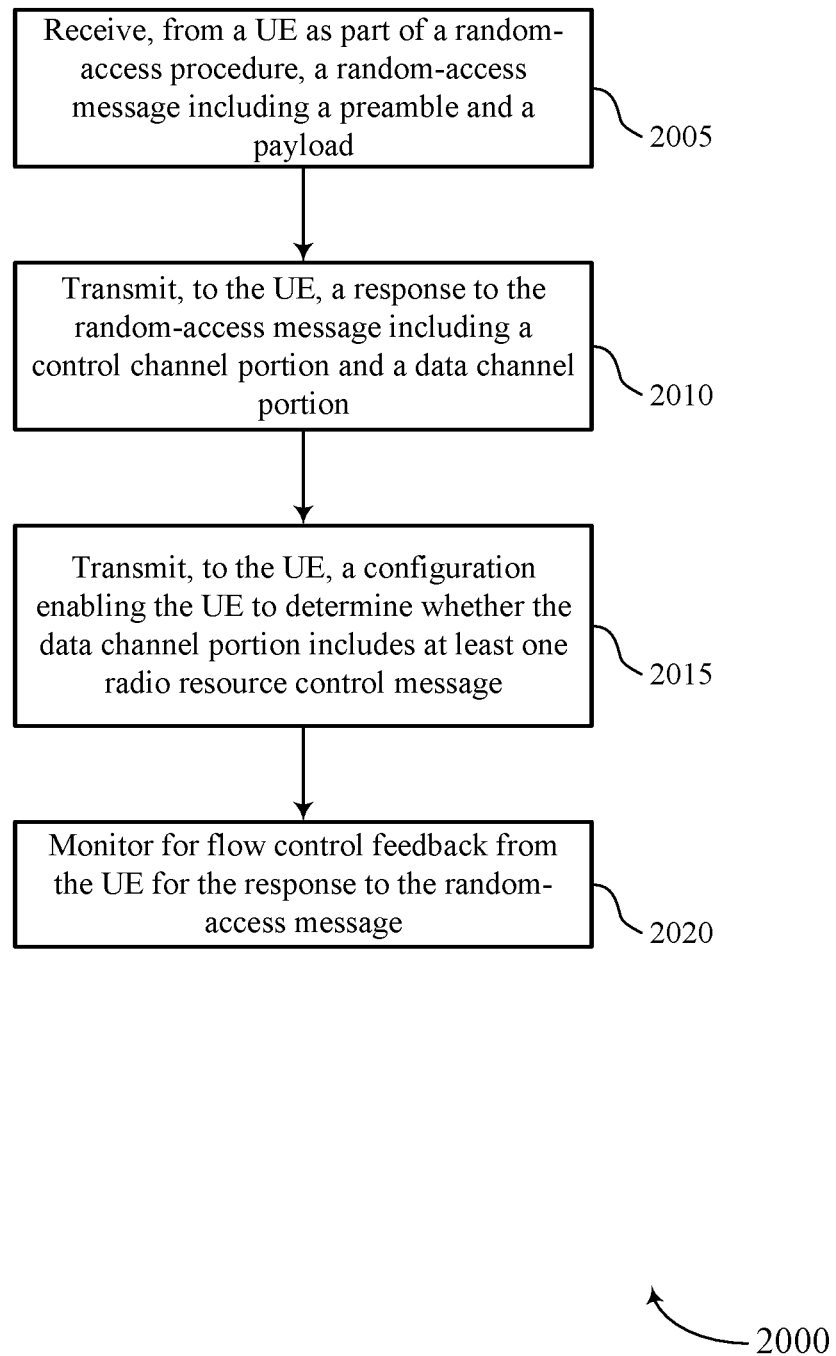

FIG. 20 shows a flowchart illustrating a method 2000 that supports feedback reporting in a two-step random-access procedure in accordance with aspects of the present disclosure. The operations of method 2000 may be implemented by a base station 105 or its components as described herein. For example, the operations of method 2000 may be performed by a communications manager as described with reference to FIGS. 15 through 18. In some examples, a base station may execute a set of instructions to control the functional elements of the base station to perform the functions described below. Additionally, or alternatively, a base station may perform aspects of the functions described below using special-purpose hardware.

At 2005, the base station may receive, from a UE as part of a random-access procedure, a random-access message including a preamble and a payload. The operations of 2005 may be performed according to the methods described herein. In some examples, aspects of the operations of 2005 may be performed by a RACH msgA manager as described with reference to FIGS. 15 through 18.

At 2010, the base station may transmit, to the UE, a response to the random-access message including a control channel portion and a data channel portion. The operations of 2010 may be performed according to the methods described herein. In some examples, aspects of the operations of 2010 may be performed by a RACH msgB manager as described with reference to FIGS. 15 through 18.

At 2015, the base station may transmit, to the UE, a configuration enabling the UE to determine whether the data channel portion includes at least one radio resource control message. The operations of 2015 may be performed according to the methods described herein. In some examples, aspects of the operations of 2015 may be performed by a RRC manager as described with reference to FIGS. 15 through 18.

At 2020, the base station may monitor for flow control feedback from the UE for the response to the random-access message. The operations of 2020 may be performed according to the methods described herein. In some examples, aspects of the operations of 2020 may be performed by a feedback manager as described with reference to FIGS. 15 through 18.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a UE, comprising: transmitting, to a base station as part of a random-access procedure, a random-access message comprising a preamble and a payload; receiving, from the base station, at least a control channel portion of a response to the random-access message, wherein the response comprises the control channel portion and a data channel portion; determining, based at least in part on at least one parameter of the control channel portion, whether the data channel portion includes at least one radio resource control message; and managing flow control feedback reporting for the response based at least in part on the determining.

Aspect 2: The method of aspect 1, further comprising: determining that the data channel portion does not include the at least one radio resource control message; determining that a timing advance timer at the UE is running; suppressing an uplink timing adjustment based at least in part on determining that the timing advance timer at the UE is running; and transmitting, to the base station, a flow control acknowledgment for the response based at least in part on determining that the data channel portion does not include the at least one radio resource control message.

Aspect 3: The method of aspect 2, further comprising: suppressing decoding of the data channel portion based at least in part on determining that the timing advance timer at the UE is running and that the data channel portion does not include the at least one radio resource control message.

Aspect 4: The method of any of aspects 1 through 3, further comprising: determining that the data channel portion does not include the at least one radio resource control message; determining that a timing advance timer at the UE has expired; and performing a decoding process on the data channel portion based at least in part on determining that the timing advance timer at the UE has expired.

Aspect 5: The method of aspect 4, further comprising: successfully decoding the data channel portion to identify timing advance information for uplink timing adjustment; obtaining the timing advance information from the successfully decoded data channel; performing the uplink timing adjustment using the timing advance information; and transmitting, to the base station, a flow control acknowledgment for the response after performing the uplink timing adjustment based at least in part on successfully decoding the data channel portion.

Aspect 6: The method of any of aspects 4 through 5, further comprising: failing to decode the data channel portion to identify timing advance information for uplink timing adjustment; failing to obtain the timing advance information from the data channel portion; and monitoring for a retransmission of the response to the random-access message to identify the timing advance information before a response window expires, wherein the response window starts from a first symbol of an earliest search space set for the control channel portion of the response, and a duration of the response window is configured by the base station and indicated in system information.

Aspect 7: The method of any of aspects 1 through 6, further comprising: determining that the data channel portion includes the at least one radio resource control message; and performing a decoding process on the data channel portion based at least in part on determining that the data channel portion includes the at least one radio resource control message.

Aspect 8: The method of aspect 7, further comprising: successfully decoding the data channel portion to identify the at least one radio resource control message and timing advance information for uplink timing adjustment; and transmitting, to the base station, a flow control acknowledgment for the response based at least in part on successfully decoding the data channel portion.

Aspect 9: The method of aspect 8, further comprising: determining that a timing advance timer at the UE has expired; and performing the uplink timing adjustment using the timing advance information based at least in part on determining that the timing advance timer at the UE has expired.

Aspect 10: The method of any of aspects 8 through 9, further comprising: determining that a timing advance timer at the UE is running; and suppressing the uplink timing adjustment based at least in part on determining that the timing advance timer at the UE is running.

Aspect 11: The method of any of aspects 7 through 10, further comprising: failing to decode the data channel portion to identify the at least one radio resource control message and timing advance information for uplink timing adjustment; determining that a timing advance timer at the UE is running; suppressing the uplink timing adjustment based at least in part on the determining; and transmitting, to the base station, a flow control negative acknowledgment for the response based at least in part on failing to decode the data channel portion.

Aspect 12: The method of any of aspects 7 through 11, further comprising: failing to decode the data channel portion to identify the at least one radio resource control message and timing advance information for uplink timing adjustment; determining that a timing advance timer at the UE has expired; and monitoring for a retransmission of the response to the random-access message comprising the at least one radio resource control message and the timing advance information.

Aspect 13: The method of any of aspects 1 through 12, wherein determining whether the data channel portion comprises the at least one radio resource control message comprises: determining a transport block size of the data channel portion based at least in part on the at least one parameter; and comparing the transport block size of the data channel portion to a threshold transport block size.

Aspect 14: The method of aspect 13, further comprising: determining that the transport block size of the data channel portion is equal to or below the threshold transport block size based at least in part on the comparing; and determining that the data channel portion does not include the at least one radio resource control message based at least in part on the transport block size of the data channel portion being equal to or below the threshold transport block size.

Aspect 15: The method of any of aspects 13 through 14, further comprising: determining that the transport block size of the data channel portion is above the threshold transport block size based at least in part on the comparing; and determining that the data channel portion includes the at least one radio resource control message based at least in part on the transport block size of the data channel portion being above the threshold transport block size.

Aspect 16: The method of any of aspects 13 through 15, further comprising: receiving, from the base station, an indication of the threshold transport block size in system information or radio resource control signaling.

Aspect 17: The method of any of aspects 1 through 16, wherein the at least one parameter of the control channel portion comprises an explicit indication of whether the data channel portion includes the at least one radio resource control message.

Aspect 18: The method of any of aspects 1 through 17, wherein managing flow control feedback reporting for the data channel portion comprises: receiving, from the base station, a resource indicator and a feedback timing indicator for the flow control feedback reporting in the control channel portion or in dedicated radio resource control signaling; and transmitting, to the base station, flow control feedback in accordance with the resource indicator and the feedback timing indicator.

Aspect 19: The method of any of aspects 1 through 18, wherein the data channel portion includes at least timing advance information for uplink timing adjustment and optionally the at least one radio resource control message, the timing advance information is derived based at least in part on the preamble of the random-access message and the at least one radio resource control message.

Aspect 20: A method for wireless communication at a base station, comprising: receiving, from a UE as part of a random-access procedure, a random-access message comprising a preamble and a payload; transmitting, to the UE, a response to the random-access message comprising a control channel portion and a data channel portion; transmitting, to the UE, a configuration enabling the UE to determine whether the data channel portion includes at least one radio resource control message; and monitoring for flow control feedback from the UE for the response to the random-access message.

Aspect 21: The method of aspect 20, wherein transmitting the configuration comprises: transmitting, to the UE, an indication of a threshold transport block size for the data channel portion, wherein a transport block size above the threshold transport block size indicates that the data channel portion includes the at least one radio resource control message, and a transport block size equal to or below the threshold transport block size indicates that the data channel portion does not include the at least one radio resource control message.

Aspect 22: The method of any of aspects 20 through 21, wherein transmitting the configuration comprises: transmitting, in the control channel, an explicit indication of whether the data channel portion includes the at least one radio resource control message.

Aspect 23: The method of any of aspects 20 through 22, further comprising: transmitting, to the UE, a resource indicator and a feedback timing indicator for the flow control feedback reporting in the control channel portion or in dedicated radio resource control signaling; and receiving, from the UE, flow control feedback in accordance with the resource indicator and the feedback timing indicator.

Aspect 24: The method of any of aspects 20 through 23, wherein the data channel portion includes at least timing advance information for uplink timing adjustment and optionally the at least one radio resource control message.

Aspect 25: An apparatus for wireless communication at a UE, comprising a processor; memory coupled with the processor; and instructions stored in the memory and executable by the processor to cause the apparatus to perform a method of any of aspects 1 through 19.

Aspect 26: An apparatus for wireless communication at a UE, comprising at least one means for performing a method of any of aspects 1 through 19.

Aspect 27: A non-transitory computer-readable medium storing code for wireless communication at a UE, the code comprising instructions executable by a processor to perform a method of any of aspects 1 through 19.

Aspect 28: An apparatus for wireless communication at a base station, comprising a processor; memory coupled with the processor; and instructions stored in the memory and executable by the processor to cause the apparatus to perform a method of any of aspects 20 through 24.

Aspect 29: An apparatus for wireless communication at a base station, comprising at least one means for performing a method of any of aspects 20 through 24.

Aspect 30: A non-transitory computer-readable medium storing code for wireless communication at a base station, the code comprising instructions executable by a processor to perform a method of any of aspects 20 through 24.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    transmitting, to a network device as part of a random-access procedure, a random-access message comprising a preamble and a payload;
    receiving, from the network device, at least a control channel portion of a response to the random-access message, wherein the response comprises the control channel portion and a data channel portion;
    managing flow control feedback based at least in part on a transport block size of the data channel portion, the transport block size being based at least in part on the control channel portion.

2. The method of claim 1, further comprising, at least one of:
    suppressing an uplink timing adjustment if a timing advance timer at the UE is running; or
    transmitting, to the network device, a flow control acknowledgment for the response if the data channel portion does not include at least one radio resource control message.

3. The method of claim 2, further comprising:
    suppressing decoding of the data channel portion if that the timing advance timer at the UE is running and the data channel portion does not include the at least one radio resource control message.

4. The method of claim 1, further comprising:
    performing a decoding process on the data channel portion if the data channel portion includes at least one radio resource control message.

5. The method of claim 4, further comprising:
    successfully decoding the data channel portion to identify the at least one radio resource control message and timing advance information for uplink timing adjustment; and
    transmitting, to the network device, a flow control acknowledgment for the response based at least in part on successfully decoding the data channel portion.

6. The method of claim 5, further comprising:
    performing the uplink timing adjustment using the timing advance information if a timing advance timer at the UE has expired.

7. The method of claim 5, further comprising:
    suppressing the uplink timing adjustment if a timing advance timer at the UE is running.

8. The method of claim 4, further comprising:
    failing to decode the data channel portion to identify the at least one radio resource control message and timing advance information for uplink timing adjustment;

suppressing the uplink timing adjustment if a timing advance timer at the UE is running; and
transmitting, to the network device, a flow control negative acknowledgment for the response based at least in part on failing to decode the data channel portion.

9. The method of claim 4, further comprising:
failing to decode the data channel portion to identify the at least one radio resource control message and timing advance information for uplink timing adjustment; and
monitoring for a retransmission of the response to the random-access message if a timing advance timer at the UE has expired, the retransmission of the response comprising the at least one radio resource control message and the timing advance information.

10. A user equipment (UE), comprising:
a transceiver;
memory comprising instructions; and
a processor configured to execute the instructions and cause the UE to:
transmit, via the transceiver to a network device as part of a random-access procedure, a random-access message comprising a preamble and a payload;
receive, via the transceiver from the network device, at least a control channel portion of a response to the random-access message, wherein the response comprises the control channel portion and a data channel portion; and
manage flow control feedback based at least in part on a transport block size of the data channel portion, the transport block size being based at least in part on the control channel portion.

11. The UE of claim 10, wherein the instructions are further executable by the processor to cause the UE to, at least one of:
suppress an uplink timing adjustment if a timing advance timer at the UE is running; or
transmit, to the network device, a flow control acknowledgment for the response if the data channel portion does not include at least one radio resource control message.

12. The UE of claim 11, wherein the instructions are further executable by the processor to cause the UE to:
suppress decoding of the data channel portion if the timing advance timer at the UE is running and the data channel portion does not include the at least one radio resource control message.

13. The UE of claim 10, wherein the instructions are further executable by the processor to cause the UE to:
perform a decoding process on the data channel portion if a timing advance timer at the UE has expired and the data channel portion does not include at least one radio resource control message.

14. The UE of claim 13, wherein the instructions are further executable by the processor to cause the UE to:
successfully decode the data channel portion to identify timing advance information for uplink timing adjustment;
obtain the timing advance information from the successfully decoded data channel portion;
perform the uplink timing adjustment using the timing advance information; and
transmit, to the network device, a flow control acknowledgment for the response after performing the uplink timing adjustment based at least in part on successfully decoding the data channel portion.

15. The UE of claim 13, wherein the instructions are further executable by the processor to cause the UE to:
fail to decode the data channel portion to identify timing advance information for uplink timing adjustment;
fail to obtain the timing advance information from the data channel portion; and
monitor for a retransmission of the response to the random-access message to identify the timing advance information before a response window expires, wherein the response window starts from a first symbol of an earliest search space set for the control channel portion of the response, and a duration of the response window is configured by the network device and indicated in system information.

16. The UE of claim 10, wherein the instructions are further executable by the processor to cause the UE to:
perform a decoding process on the data channel portion if the data channel portion includes at least one radio resource control message.

17. The UE of claim 16, wherein the instructions are further executable by the processor to cause the UE to:
successfully decode the data channel portion to identify the at least one radio resource control message and timing advance information for uplink timing adjustment; and
transmit, to the network device, a flow control acknowledgment for the response based at least in part on successfully decoding the data channel portion.

18. The UE of claim 17, wherein the instructions are further executable by the processor to cause the UE to:
perform the uplink timing adjustment using the timing advance information if a timing advance timer at the UE has expired.

19. The UE of claim 17, wherein the instructions are further executable by the processor to cause the UE to:
suppress the uplink timing adjustment if a timing advance timer at the UE is running.

20. The UE of claim 16, wherein the instructions are further executable by the processor to cause the UE to:
fail to decode the data channel portion to identify the at least one radio resource control message and timing advance information for uplink timing adjustment;
suppress the uplink timing adjustment if a timing advance timer at the UE is running; and
transmit, to the network device, a flow control negative acknowledgment for the response based at least in part on failing to decode the data channel portion.

21. The UE of claim 16, wherein the instructions are further executable by the processor to cause the UE to:
fail to decode the data channel portion to identify the at least one radio resource control message and timing advance information for uplink timing adjustment; and
monitor for a retransmission of the response to the random-access message if a timing advance timer at the UE has expired, the retransmission of the response comprising the at least one radio resource control message and the timing advance information.

22. The UE of claim 16, wherein at least one parameter of the control channel portion comprises an explicit indication of whether the data channel portion includes the at least one radio resource control message.

23. The UE of claim 10, wherein the instructions are further executable by the processor to cause the UE to:
compare the transport block size of the data channel portion to a threshold transport block size, wherein managing the flow control feedback is further based at least in part on the comparison.

24. The UE of claim 23, wherein the instructions are further executable by the processor to cause the UE to:
suppress decoding of the data channel portion if the transport block size of the data channel portion is equal to or below the threshold transport block size based at least in part on the comparison.

25. The UE of claim 23, wherein the instructions are further executable by the processor to cause the UE to:
perform a decoding process on the data channel portion if the transport block size of the data channel portion is above the threshold transport block size based at least in part on the comparison.

26. The UE of claim 23, wherein the instructions are further executable by the processor to cause the UE to:
receive, via the transceiver from the network device, an indication of the threshold transport block size in system information or radio resource control signaling.

27. The UE of claim 10, wherein the instructions to manage flow control feedback are executable by the processor to cause the UE to:
receive, from the network device, a resource indicator and a feedback timing indicator for the flow control feedback in the control channel portion or in dedicated radio resource control signaling; and
transmit, to the network device, the flow control feedback in accordance with the resource indicator and the feedback timing indicator.

28. The UE of claim 10, wherein the data channel portion includes at least one of timing advance information or at least one radio resource control message, the timing advance information being based at least in part on one of the preamble of the random-access message or the at least one radio resource control message.

29. The UE of claim 10, wherein the instructions to manage flow control feedback are executable by the processor to cause the UE to:
manage the flow control feedback further based at least in part on the control channel portion being addressed to a radio network temporary identifier associated with the random-access procedure, the random-access procedure being a two-step random-access procedure.

30. The UE of claim 29, wherein a cyclic redundancy check portion of the control channel portion is masked by the radio network temporary identifier associated with the two-step random-access procedure.

31. The UE of claim 10, wherein the instructions to manage flow control feedback are executable by the processor to cause the UE to:
manage the flow control feedback further based at least in part on the control channel portion being addressed to a cell radio network temporary identifier.

32. The UE of claim 31, wherein a cyclic redundancy check portion of the control channel portion is masked by the cell radio network temporary identifier.

33. A user equipment (UE), comprising:
means for transmitting, to a network device as part of a random-access procedure, a random-access message comprising a preamble and a payload;
means for receiving, from the network device, at least a control channel portion of a response to the random-access message, wherein the response comprises the control channel portion and a data channel portion; and
means for managing flow control feedback based at least in part on a transport block size of the data channel portion, the transport block size being based at least in part on the control channel portion.

34. A non-transitory computer-readable medium storing code for wireless communication at a user equipment (UE), the code comprising instructions executable by a processor to:
transmit, to a network device as part of a random-access procedure, a random-access message comprising a preamble and a payload;
receive, from the network device, at least a control channel portion of a response to the random-access message, wherein the response comprises the control channel portion and a data channel portion; and
manage flow control feedback based at least in part on a transport block size of the data channel portion, the transport block size being based at least in part on the control channel portion.

* * * * *